(12) United States Patent
Gutfeldt et al.

(10) Patent No.: US 11,923,642 B2
(45) Date of Patent: Mar. 5, 2024

(54) APPARATUS, SYSTEM, AND METHOD FOR PROTECTING POWER CONNECTORS AGAINST HIGH-POWER ARCING

(71) Applicant: Juniper Networks, Inc., Sunnyvale, CA (US)

(72) Inventors: Theodor A. Gutfeldt, Sunnyvale, CA (US); Phu H. Truong, Sunnyvale, CA (US); Katsuhiro Okamura, Sunnyvale, CA (US); Viktor Sokolenko, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 448 days.

(21) Appl. No.: 17/172,662

(22) Filed: Feb. 10, 2021

(65) Prior Publication Data
US 2022/0255269 A1 Aug. 11, 2022

(51) Int. Cl.
| | |
|---|---|
| *G06F 1/26* | (2006.01) |
| *H01R 13/639* | (2006.01) |
| *H01R 13/703* | (2006.01) |
| *H01R 13/74* | (2006.01) |

(52) U.S. Cl.
CPC .......... *H01R 13/7038* (2013.01); *G06F 1/26* (2013.01); *H01R 13/639* (2013.01); *H01R 13/748* (2013.01)

(58) Field of Classification Search
CPC ....................................................... H05K 5/00
See application file for complete search history.

(56) References Cited

U.S. PATENT DOCUMENTS

| | | |
|---|---|---|
| 4,863,233 A | 9/1989 | Nienaber et al. |
| 2005/0165274 A1* | 7/2005 | Abe .................... A61B 1/04 600/117 |
| 2009/0141412 A1 | 6/2009 | Hickam |
| 2017/0133792 A1* | 5/2017 | Werley ............ H01R 13/6683 |

FOREIGN PATENT DOCUMENTS

| | | |
|---|---|---|
| DE | 20 2015 106121 U1 | 2/2017 |
| EP | 2 149 940 A1 | 2/2010 |
| EP | 3 229 328 A1 | 10/2017 |
| JP | 2004-158332 A | 6/2004 |
| WO | 2014/153779 A1 | 10/2014 |
| WO | 2017/090388 A1 | 6/2017 |

OTHER PUBLICATIONS

Extended European Search Report received for EP Patent Application Serial No. 21171261.7 dated Feb. 21, 2022, 10 pages.

* cited by examiner

*Primary Examiner* — Jerry Wu
(74) *Attorney, Agent, or Firm* — Greenberg Traurig, LLP

(57) ABSTRACT

A disclosed apparatus may include (1) a power enclosure electrically coupled to a power supply module of a computing device, (2) a power connector that (A) is electrically coupled to a power cable that facilitates carrying electric current to the power supply module via the power enclosure and (B) is dimensioned to mate with the power enclosure, and (3) at least one power switch that (A) is electrically coupled to the power enclosure, (B) is configured to be engaged by at least one feature of the power connector while the power connector is fully mated with the power enclosure, and when engaged by the feature of the power connector, (C) enables electric current to flow from the power connector to the power supply module via the power enclosure. Various other apparatuses, systems, and methods are also disclosed.

20 Claims, 27 Drawing Sheets

APPARATUS, SYSTEM, AND METHOD FOR PROTECTING POWER CONNECTORS AGAINST HIGH-POWER ARCING

BACKGROUND

In today's world of vast computing technology, telecommunications devices are continually evolving to meet customers' needs and/or demands. For example, telecommunications equipment manufacturers often undertake efforts to increase the bitrates of their telecommunications devices. To do so, these manufacturers may also need to increase the power consumption of their telecommunications devices. Such increased power consumption may involve and/or necessitate power collectively drawn and/or sourced through multiple power supplies.

These telecommunications devices may include and/or provide power connection points to which high-power connecters are installed and/or removed. For example, an administrator may install and/or attach a high-power Direct Current (DC) connector to a connection point on a telecommunications device. Later, the administrator may remove and/or detach the high-power DC connector from the connection point while electric current is flowing. Unfortunately, by removing and/or detaching the high-power DC connector while electric current is flowing, the administrator may create a situation that results in electrical arcing between the high-power DC connector and the connection point on the telecommunications device.

Such arcing may pose and/or present a risk of damage to the telecommunications device, a risk of fire, a risk of electrocution and/or burns to the administrator, and/or a risk of damage to the reputation and/or brand of the manufacturer of the telecommunications device. The instant disclosure, therefore, identifies and addresses a need for apparatuses, systems, and methods for protecting power connectors against high-power arcing.

SUMMARY

As will be described in greater detail below, the instant disclosure generally relates to apparatuses, systems, and methods for protecting power connectors against high-power arcing. In one example, an apparatus for accomplishing such a task may include (1) a power enclosure electrically coupled to a power supply module of a computing device, (2) a power connector that (A) is electrically coupled to a power cable that facilitates carrying electric current to the power supply module via the power enclosure and (B) is dimensioned to mate with the power enclosure, and (3) at least one power switch that (A) is electrically coupled to the power enclosure, (B) is configured to be engaged by at least one feature of the power connector while the power connector is fully mated with the power enclosure, and when engaged by the feature of the power connector, (C) enables electric current to flow from the power connector to the power supply module via the power enclosure.

Similarly, a system for accomplishing such a task may include (1) a power supply module, (2) a power enclosure electrically coupled to the power supply module, (3) a power connector that (A) is electrically coupled to a power cable that facilitates carrying electric current to the power supply module via the power enclosure and (B) is dimensioned to mate with the power enclosure, (4) at least one power switch that (A) is electrically coupled to the power enclosure, (B) is configured to be engaged by at least one feature of the power connector while the power connector is fully mated with the power enclosure, and when engaged by the feature of the power connector, (C) enables electric current to flow from the power connector to the power supply module via the power enclosure.

A corresponding method may include (1) electrically coupling a power enclosure to a power supply module of a computing device and (2) electrically coupling at least one power switch to the power enclosure, the power switch being configured for engagement by at least one feature of the power connector while the power connector is fully mated with the power enclosure such that (A) when engaged by the feature of the power connector, the power switch enables electric current to flow from the power connector to the power supply module via the power enclosure and (B) when not engaged by the feature of the power connector, the power switch prevents the electric current from flowing to the power supply module via the power enclosure.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
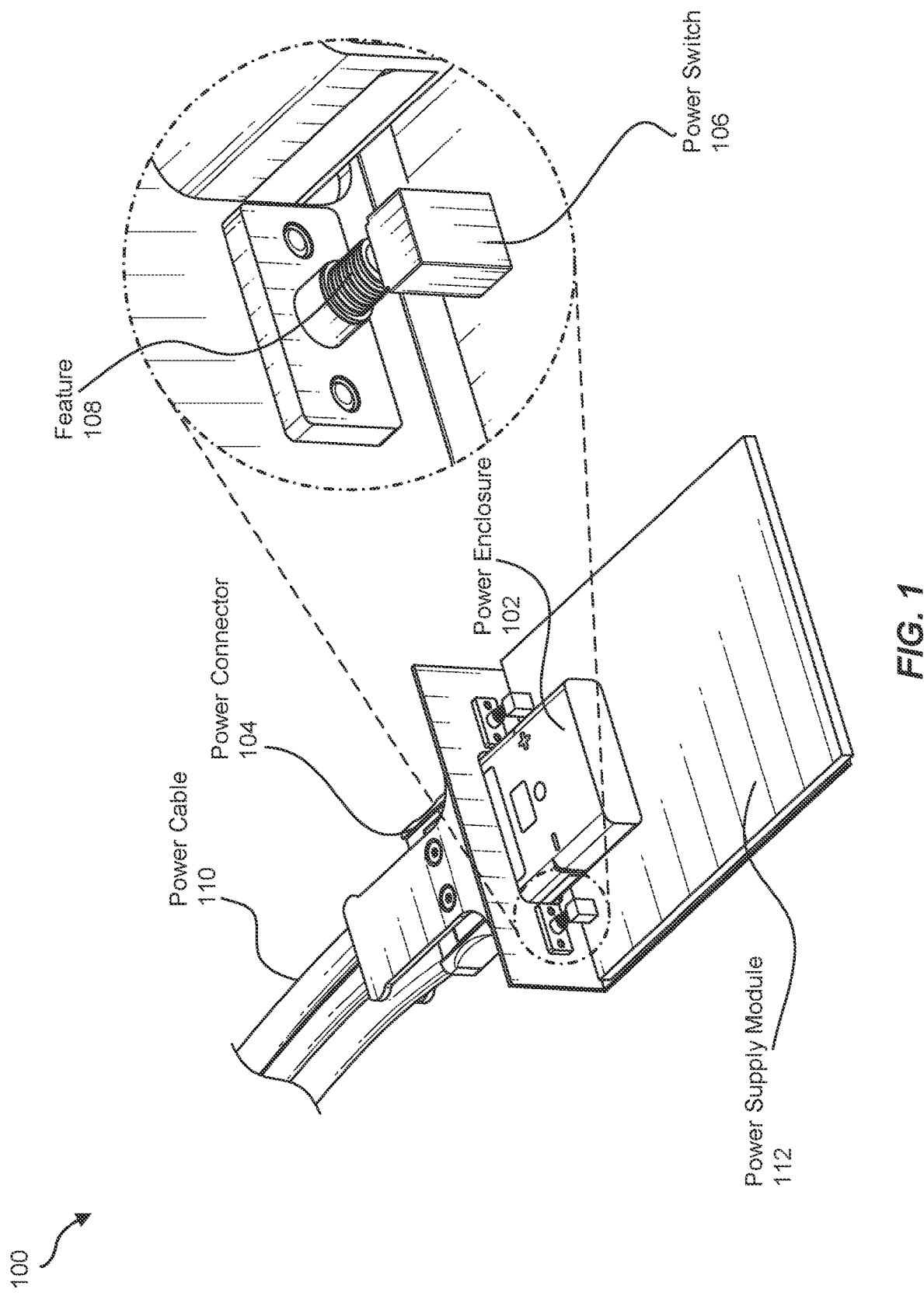
FIG. 1 is an illustration of an exemplary apparatus for protecting power connectors against high-power arcing.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for protecting power connectors against high-power arcing. As will be explained in greater detail below, embodiments of the instant disclosure may prevent and/or eliminate dangerous situations in which arcing occurs between high-power DC connectors and connection points on telecommunications devices. By doing so, these embodiments may mitigate various risks that result from such arching, including fire, electrocution or burns, damage to equipment, and/or damage to the reputation and/or brand of the equipment manufacturer.

The following will provide, with reference to FIGS. 1-26, detailed descriptions of exemplary components, apparatuses, systems, configurations, and/or implementations for protecting power connectors against high-power arcing. In addition, the discussion corresponding to FIG. 27 will provide a detailed description of an exemplary method for protecting power connectors against high-power arcing.

FIG. 1 illustrates an exemplary apparatus 100 for protecting power connectors against high-power arcing. As illustrated in FIG. 1, exemplary apparatus 100 may include and/or represent a power enclosure 102, a power connector 104, a power switch 106, a power cable 110, and/or a power supply module 112. In some examples, power enclosure 102 may be electrically coupled to power supply module 112. In such examples, power connector 104 may be electrically coupled to power cable 110, which facilitates carrying electric current to power supply module 112 via power enclosure 102. Additionally or alternatively, power connector 104 may be dimensioned to mate with power enclosure 102.

In some examples, power switch 106 may be electrically coupled to power enclosure 102. In such examples, power switch 106 may be configured and/or designed to be engaged by a feature 108 of power connector 104 while power connector 104 is fully mated with and/or to power enclosure 102. Additionally or alternatively, when engaged by feature 108 of power connector 104, power switch 106 may enable electric current to flow from power connector 104 to power supply module 112 via power enclosure 102.

In some examples, power enclosure 102 and/or power connector 104 may include and/or represent a female power receptacle and/or housing designed to accept and/or interface with a male power connector. Additionally or alternatively, power enclosure 102 and/or power connector 104 may include and/or represent a male power connector designed to accept and/or interface with a female power connector. In one example, power enclosure 102 and/or power connector 104 may be designed and/or fitted to mate and/or interface with one another.

In some examples, power enclosure 102, power connector 104, power switch 106, power cable 110, and/or power supply module 112 may each include and/or contain certain electrically conductive layers and/or traces. Such conductive layers and/or traces may include and/or represent electrically conductive materials. Examples of such electrically conductive materials include, without limitation, copper, aluminum, silver, gold, metals, alloys of one or more of the same, combinations or variations of one or more of the same, and/or any other suitable materials.

In some examples, power enclosure 102, power connector 104, power switch 106, power cable 110, and/or power supply module 112 may each also include and/or contain certain non-conductive and/or insulative materials. Examples of such non-conductive and/or insulative materials include, without limitation, plastics, ceramics, polymers, composites, rubbers, dielectrics, combinations or variations of one or more of the same, and/or any other suitable materials.

In some examples, power enclosure 102, power connector 104, power cable 110, and/or power supply module 112 may include and/or contain electrically conductive materials designed and/or intended to carry, transfer, and/or deliver electric current from power cable 110 to power supply module 112 via power connector 104 and power enclosure 102. In such examples, the electric current carried, transferred, and/or delivered by those conductive materials may be direct current or alternating current. In one example, the electric current may be guided and/or directed toward power supply module 112 by certain non-conductive and/or insulative materials included and/or contained in power enclosure 102, power connector 104, power cable 110, and/or power supply module 112.

In some examples, power switch 106 may include and/or represent an electronic switch, an electronic plate, and/or a button. In such examples, when engaged by feature 108 of power connector 104, power switch 106 may cause power enclosure 102 to allow and/or enable the flow of electric current carried by power cable 110 to reach power supply module 112 via power connector 104 and power enclosure 102. Additionally or alternatively, when engaged by feature 108 of power connector 104, power switch 106 may effectively close a circuit that enables the flow of electric current from power cable 110 to reach power supply module 112 via power connector 104 and power enclosure 102. By doing so, power switch 106 may prevent and/or protect against electrical arcing as power connector 104 is inserted and/or installed into power enclosure 102.

In contrast, when not engaged by feature 108 of power connector 104, power switch 106 may cause power enclosure 102 to disallow, disable, and/or prevent electric current from flowing from power cable 110 to power supply module 112 via power connector 104 and/or power enclosure 102. Additionally or alternatively, when not engaged by feature 108 of power connector 104, power switch 106 may effectively open a circuit that disables the flow of electric current from power cable 110 to power supply module 112 via power connector 104 and/or power enclosure 102. By doing so, power switch 106 may prevent and/or protect against electrical arcing as power connector 104 is removed and/or uninstalled from power enclosure 102.

In some examples, feature 108 of power connector 104 may include and/or represent a screw that interfaces and/or makes contact with power switch 106, thereby engaging power switch 106 to facilitate the flow of electric current across power enclosure 102, power connector 104, power cable 110, and/or power supply module 112. For example, feature 108 may include and/or represent a thumb screw whose tip engages power switch 106 once power connector 104 and power enclosure 102 are fully and/or properly mated together. Additional examples of feature 108 include, without limitation, latches, members, pegs, pins, arms, bolts, screws, fasteners, combinations of one or more of the same, and/or any other suitable features.

In some examples, a full and/or proper mating between power connector 104 and power enclosure 102 may involve and/or entail securely fastening one to the other and/or limiting any gaps and/or space between the conductive features incorporated into power connector 104 and power enclosure 102. Accordingly, such a full and/or proper mating between power connector 104 and power enclosure 102 may mitigate, eliminate, and/or prevent the possibility of high-power arcing.

Continuing with this example, the thumb screw may be dimensioned such that its tip is unable to reach and/or engage power switch 106 unless power connector 104 and power enclosure 102 are fully and/or properly mated together. Only then, in this example, may the thumb screw engage power switch 106 for the purpose of activating the flow of electric current across power enclosure 102, power connector 104, power cable 110, and/or power supply module 112. As a result, this configuration and/or design may mitigate various risks that result from high-power arching, including fire, electrocution or burns, damage to equipment, and/or damage to the reputation and/or brand of the equipment manufacturer.

Power enclosure 102, power connector 104, power switch 106, feature 108, power cable 110, and/or power supply module 112 may each include and/or form any suitable shape. In addition, power enclosure 102, power connector 104, power switch 106, feature 108, power cable 110, and/or power supply module 112 may be of any suitable sizes and/or dimensions.

Figure 2:
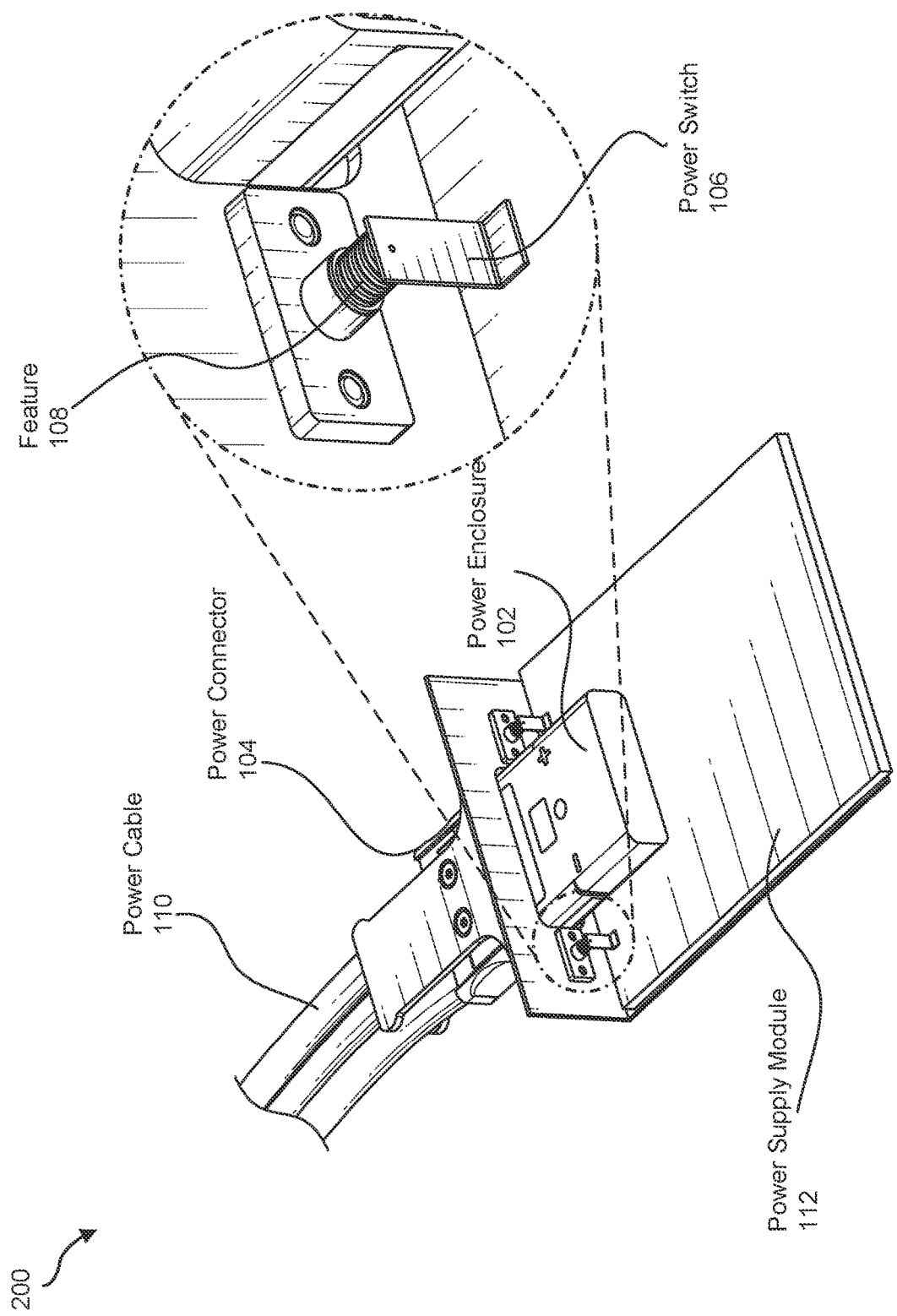
FIG. 2 is an illustration of an exemplary apparatus for protecting power connectors against high-power arcing.

FIG. 2 illustrates an exemplary apparatus 200 for protecting power connectors against high-power arcing. Like apparatus 100 in FIG. 1, exemplary apparatus 200 in FIG. 2 may include and/or represent power enclosure 102, power connector 104, power switch 106, power cable 110, and/or power supply module 112. In some examples, apparatus 200 in FIG. 2 may implement and/or incorporate any of the technologies, configurations, designs, components, and/or features described above in connection with apparatus 100 in FIG. 1.

In some examples, power enclosure 102 may include and/or represent one or more electrical contacts. In such examples, power connector 104 may include and/or represent one or more electrical contacts that electrically couple with and/or to the electrical contacts of power enclosure 102. This electrical coupling may enable electric current to flow from power cable 110 to power supply module 112 via power connector 104 and power enclosure 102.

In some examples, power switch 106 may change from an "off" state in which feature 108 of power connector 104 is not engaged to an "on" state in which feature 108 of power connector 104 is engaged. This change from the "off" state to the "on" state may occur only after power connector 104 has been fully and/or properly mated with and/or installed to power enclosure 102. Upon changing to the "on" state, power switch 106 may enable, activate, and/or initiate the flow of electric current from power connector 104 to power supply module 112 via power enclosure 102. By doing so, power switch 106 may facilitate powering, activating, and/or energizing power supply module 112 safely without the possibility of electrical arcing.

In other examples, power switch 106 may change from an "on" state in which feature 108 of power connector 104 is engaged to an "off" state in which feature 108 of power connector 104 is not engaged. Upon changing to the "off" state, power switch 106 may interrupt, disable, and/or stop the flow of electric current from power connector 104 to power supply module 112 via power enclosure 102 to prevent electrical arcing as power connector 104 is removed and/or uninstalled from power enclosure 102.

In some examples, power enclosure 102 may include and/or form one or more holes fitted to accept one or more features 108 of power connector 104. For example, power enclosure 102 may include and/or form one or more holes fitted to accept one or more thumb screws of power connector 104. In one example, power switch 106 may include and/or represent a plate positioned to facilitate contact with a screw of power connector 104 once fully mated with power enclosure 102.

In some examples, the contact between the screw and the plate may cause a signal to propagate to power enclosure 102. In such examples, the signal may be indicative of power connector 104 being fully mated with power enclosure 102. In response to the signal, power enclosure 102 may enable electric current to flow from power connector 104 to power supply module 112 via power enclosure 102.

In some examples, the screw may effectively close a circuit via the plate while power connector 104 is fully mated with power enclosure 102. In such examples, the closed circuit may cause power enclosure 102 to enable electric current to flow from power connector 104 to power supply module 112 via power enclosure 102.

In one example, power switch 106 may include and/or represent an electronic switch and/or button positioned to facilitate contact with a screw of power connector 104 once fully mated with power enclosure 102. For example, the screw of power connector 104 may compress the electronic switch and/or button when power connector 104 is fully and/or properly mated with power enclosure 102. In this example, the compression of the switch and/or button may cause a signal to propagate to power enclosure 102. The signal may be indicative of power connector 104 being fully mated with power enclosure 102. In response to the signal, power enclosure 102 may enable electric current to flow from power connector 104 to power supply module 112 via power enclosure 102.

Figure 3:
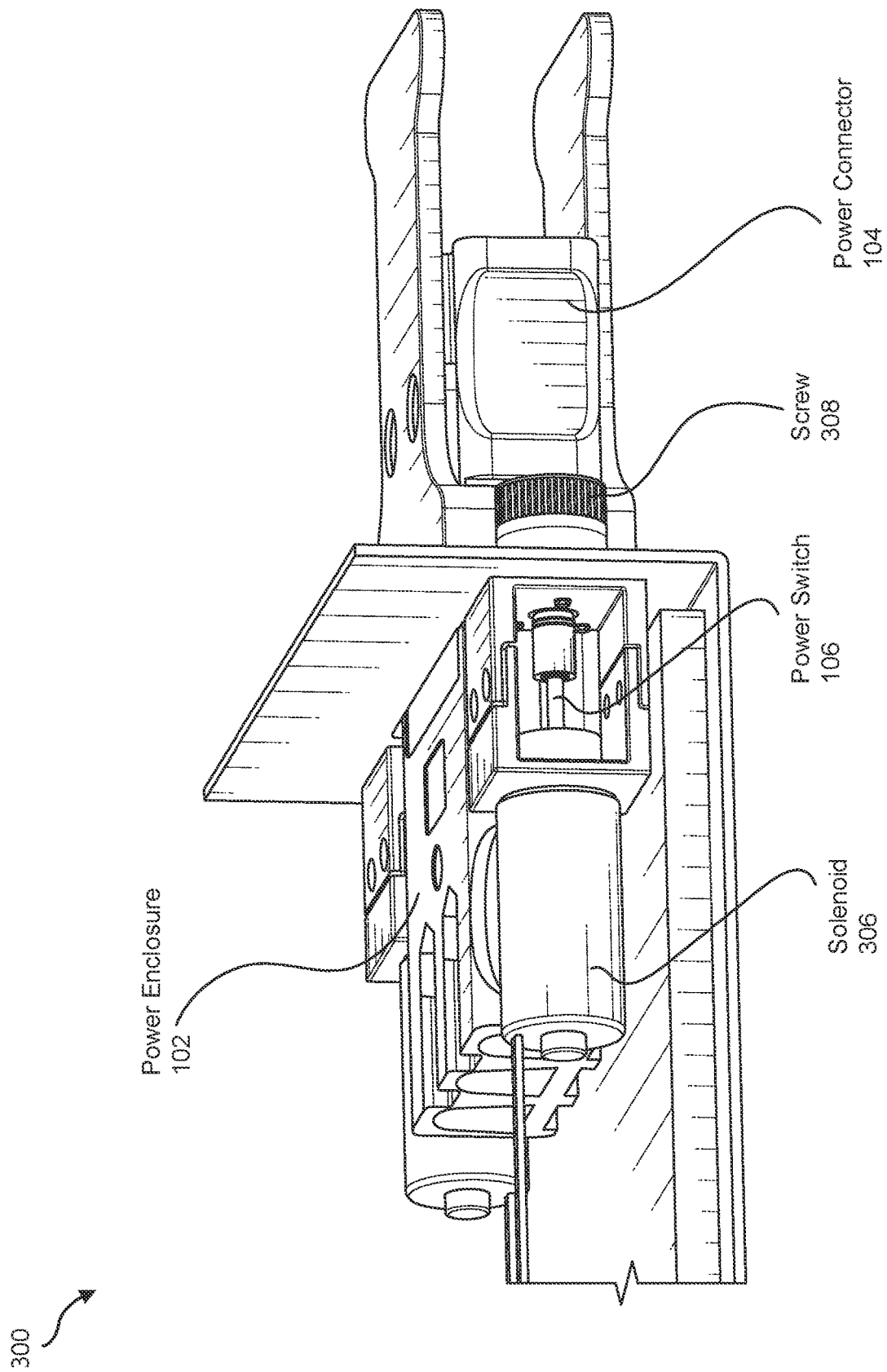
FIG. 3 is an illustration of an exemplary apparatus for protecting power connectors against high-power arcing.

FIG. 3 illustrates an exemplary apparatus 300 for protecting power connectors against high-power arcing. Like apparatus 200 in FIG. 2, exemplary apparatus 300 in FIG. 3 may include and/or represent power enclosure 102, power connector 104, power switch 106, power cable 110, and/or power supply module 112. In some examples, apparatus 300 in FIG. 3 may implement and/or incorporate any of the technologies, configurations, designs, components, and/or features described above in connection with the apparatuses illustrated in FIGS. 1 and 2.

In some examples, power switch 106 may include, involve, and/or represent a solenoid 306 that locks and/or retains a screw 308 in place while electric current is flowing from power connector 104 to power supply module 112 via power enclosure 102. In one example, when screw 308 is fully locked and/or retained by solenoid 306, power switch 106 may enable and/or activate the flow of electrical current from power connector 104 to power supply module 112 via power enclosure 102. Additionally or alternatively, when screw 308 is not fully locked and/or retained by solenoid 306, power switch 106 may disable and/or deactivate the flow of electrical current from power connector 104 to power supply module 112 via power enclosure 102.

Figure 4:
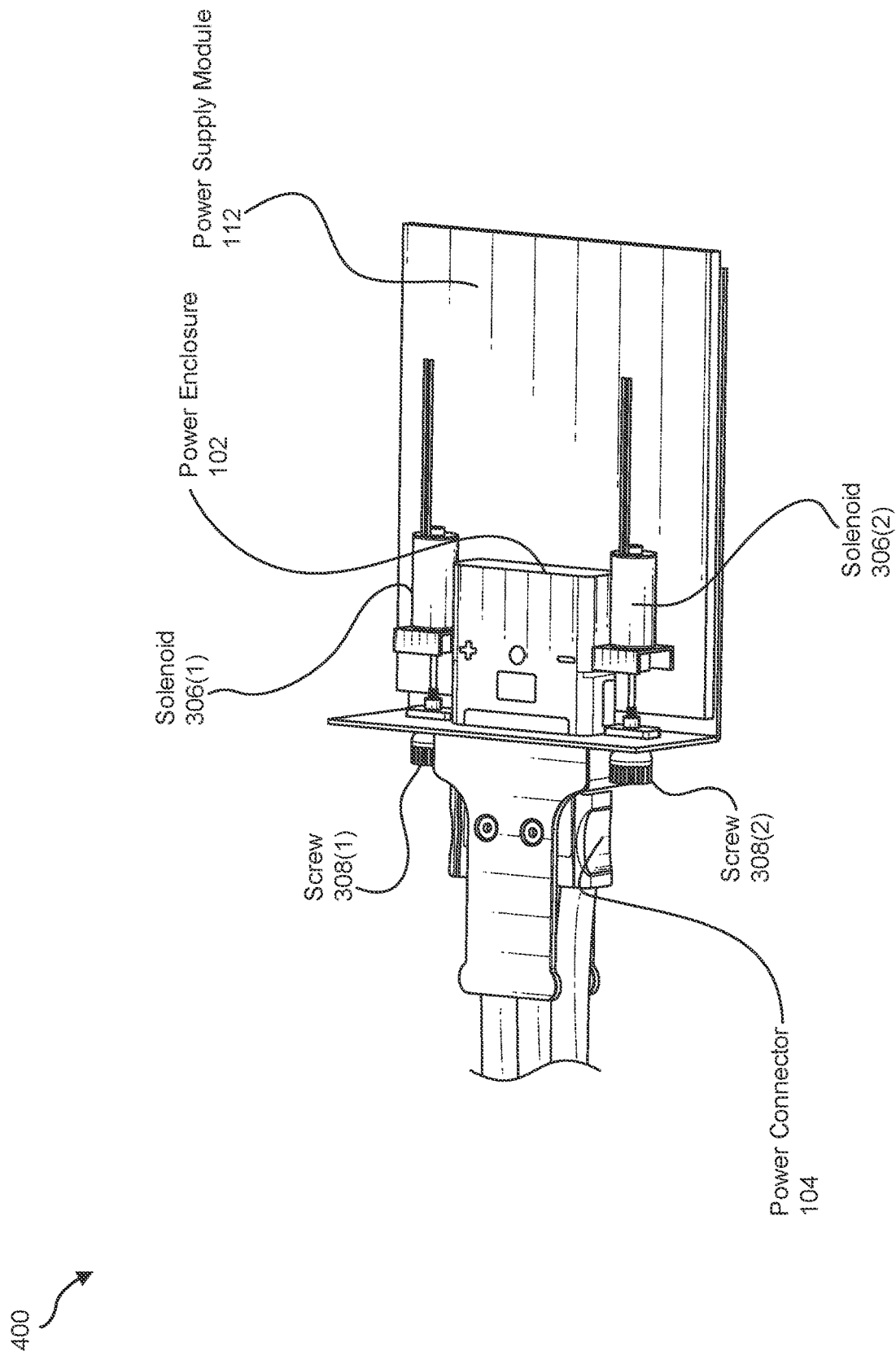
FIG. 4 is an illustration of an exemplary apparatus for protecting power connectors against high-power arcing.

FIG. 4 illustrates an exemplary apparatus 400 for protecting power connectors against high-power arcing. As illustrated in FIG. 4, exemplary apparatus 400 may include and/or represent power enclosure 102, power connector 104, power supply module 112, screws 308(1) and 308(2), and/or solenoids 306(1) and 306(2). In some examples, apparatus 400 in FIG. 4 may implement and/or incorporate any of the technologies, configurations, designs, components, and/or features described above in connection with the apparatuses illustrated in FIGS. 1-3.

Figure 5:
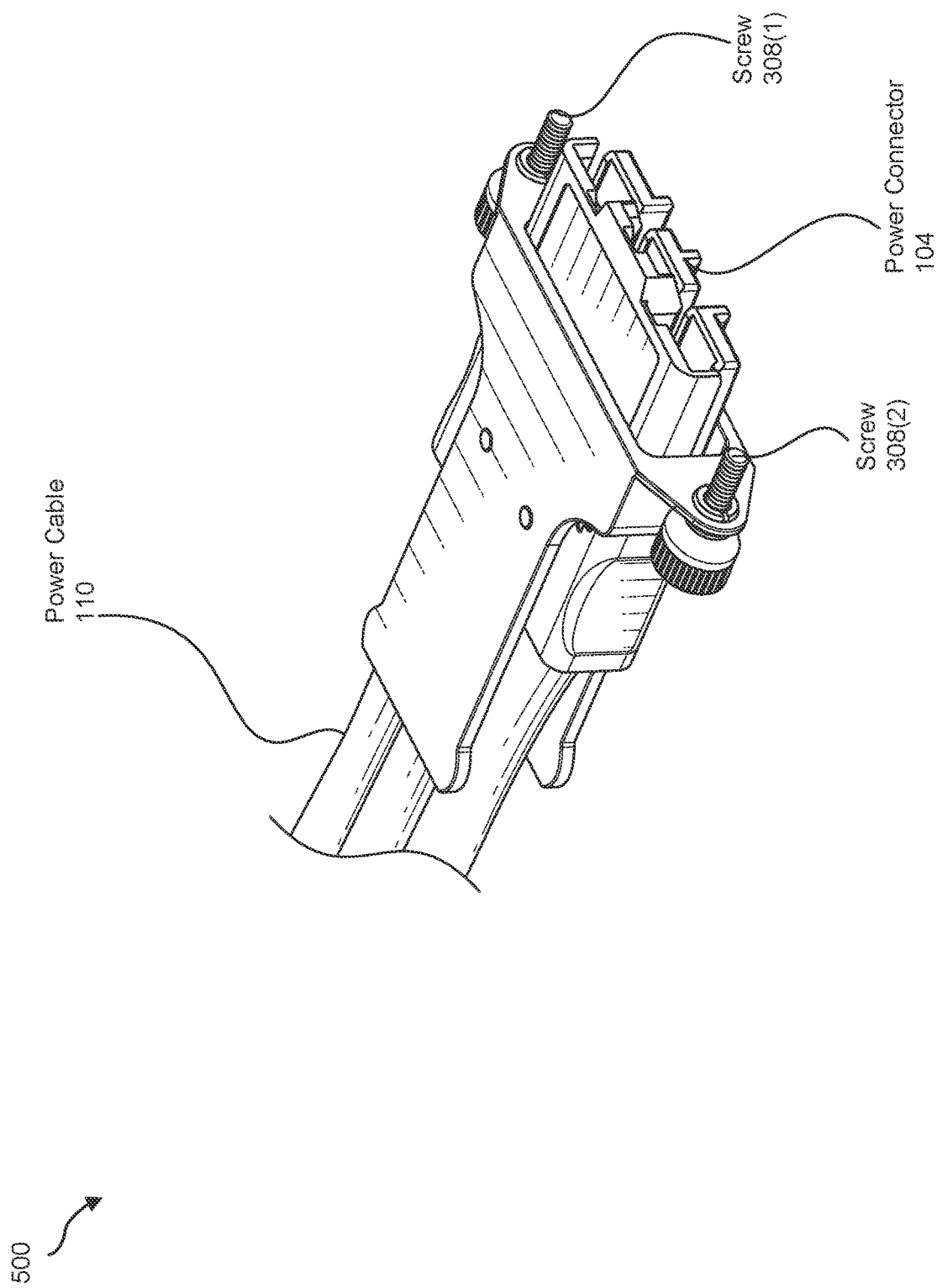
FIG. 5 is an illustration of an exemplary apparatus for protecting power connectors against high-power arcing.
Figure 6:
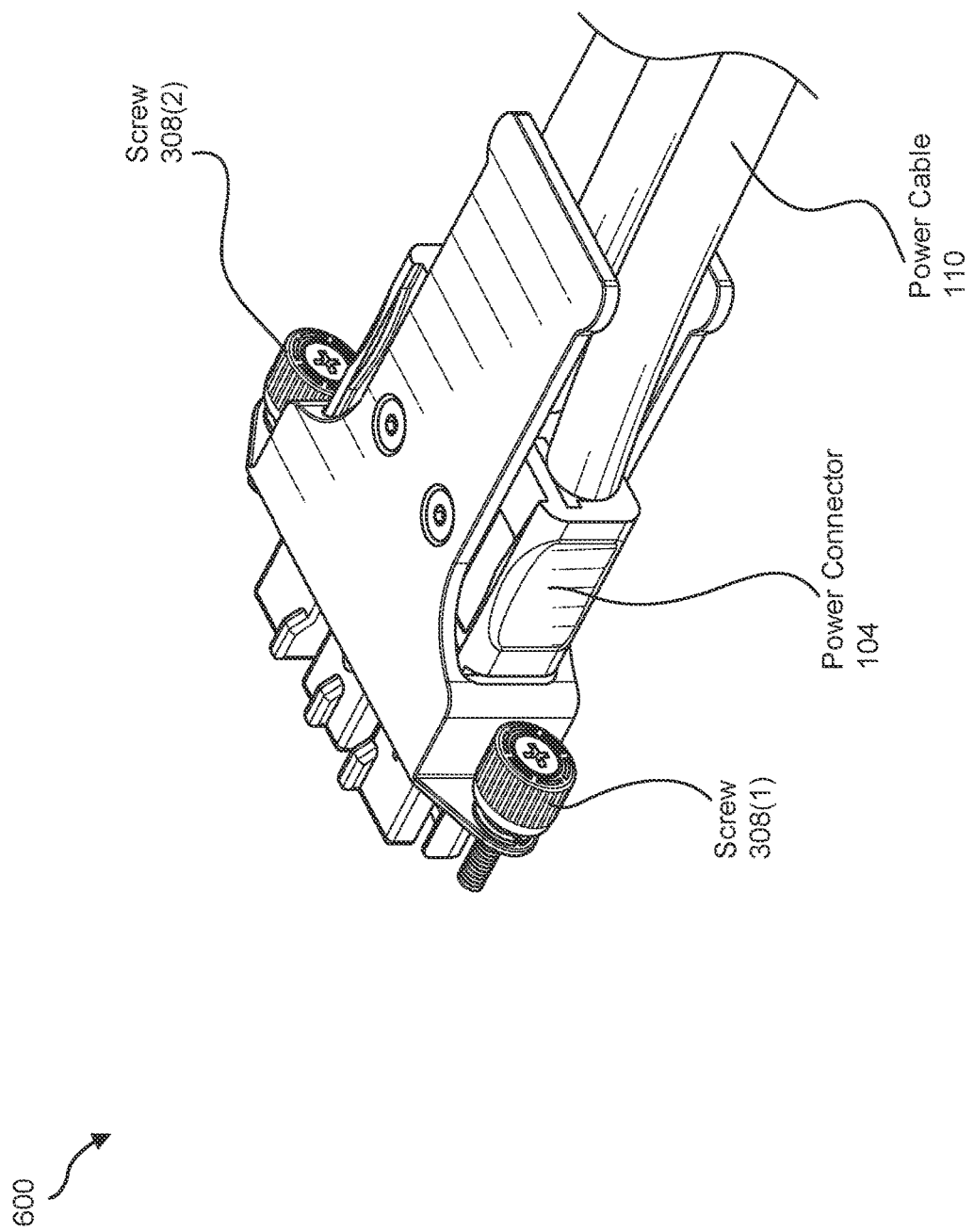
FIG. 6 is an illustration of an exemplary apparatus for protecting power connectors against high-power arcing.

FIGS. 5 and 6 illustrate exemplary apparatuses 500 and 600, respectively, for protecting power connectors against high-power arcing. As illustrated in FIGS. 5 and 6, exemplary apparatuses 500 and 600 may include and/or represent power connector 104, power cable 110, and/or screws 308(1) and 308(2). In some examples, apparatuses 500 and 600 in FIGS. 5 and 6, respectively, may implement and/or incorporate any of the technologies, configurations, designs, components, and/or features described above in connection with the apparatuses illustrated in FIGS. 1-4.

Figure 7:
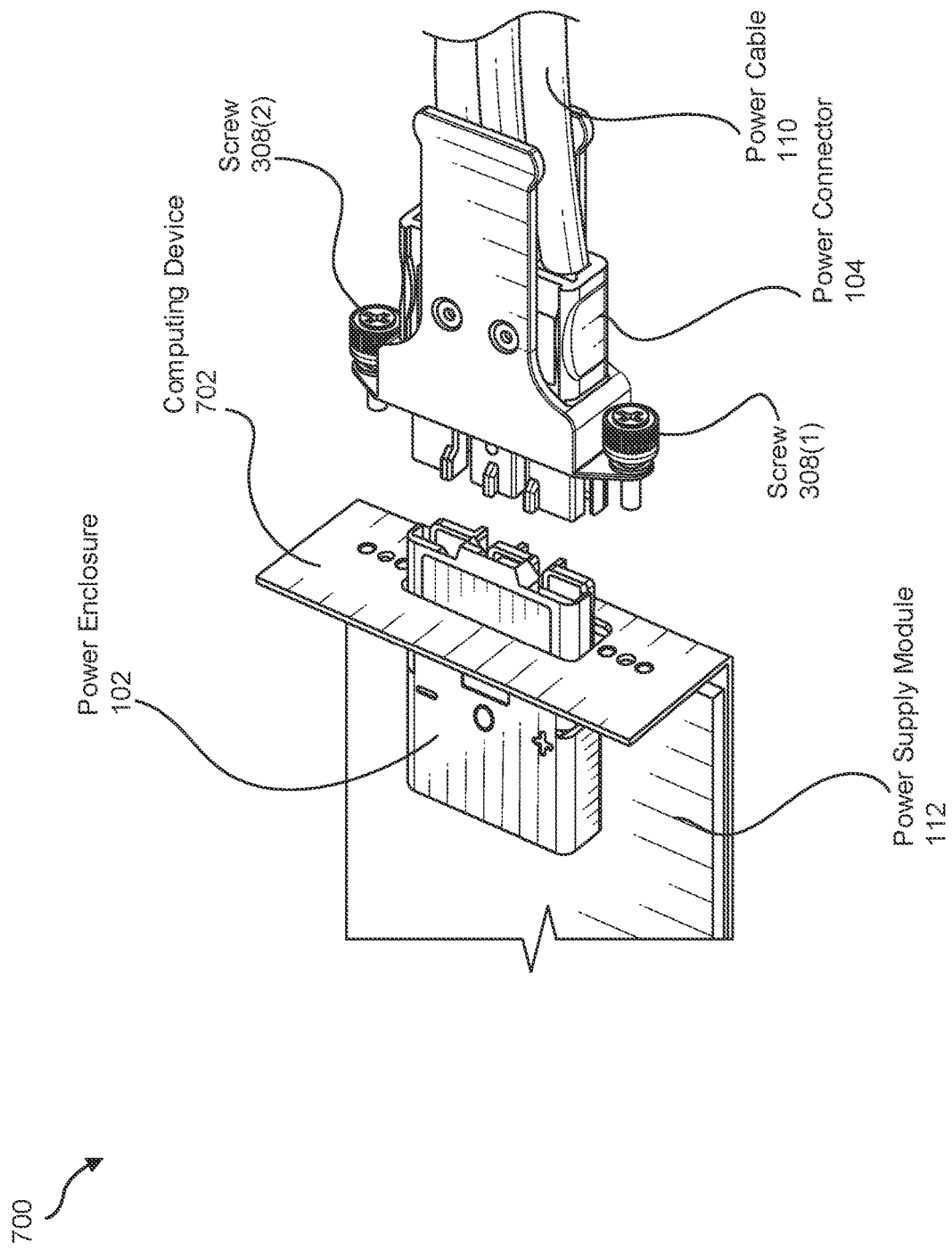
FIG. 7 is an illustration of an exemplary system for protecting power connectors against high-power arcing.
Figure 8:
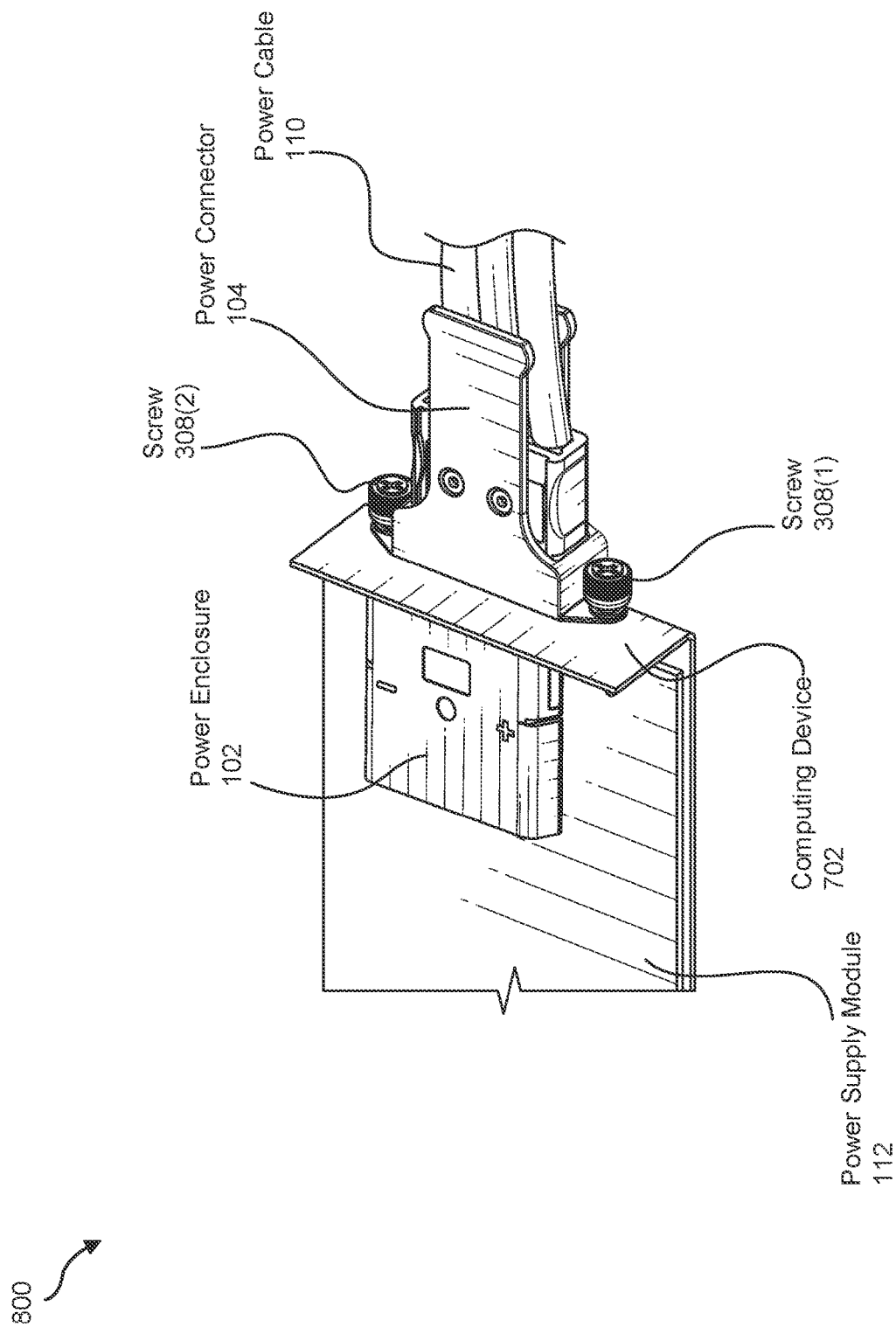
FIG. 8 is an illustration of an exemplary system for protecting power connectors against high-power arcing.

FIGS. 7 and 8 illustrate exemplary systems 700 and 800 for protecting power connectors against high-power arcing. As illustrated in FIGS. 7 and 8, exemplary systems 700 and 800 may include and/or represent power enclosure 102, power connector 104, power cable 110, power supply module 112, and/or screws 308(1) and 308(2). In some examples, exemplary systems 700 and 800 may also include and/or represent a computing device 702 that houses certain features, including power supply module 112 and/or power enclosure 102. Systems 700 and 800 in FIGS. 7 and 8, respectively, may implement and/or incorporate any of the technologies, configurations, designs, components, and/or features described above in connection with the apparatuses illustrated in FIGS. 1-6. In one example, computing device 702 may include and/or represent the chassis of a telecommunications device (such as a router or switch).

In one example, system 700 in FIG. 7 may demonstrate and/or represent a situation in which power connector 104 is currently in the processing of being installed into and/or mated with power enclosure 102. In another example, system 700 in FIG. 7 may demonstrate and/or represent a situation in which power connector 104 is currently in the processing of being uninstalled and/or removed from power enclosure 102. Additionally or alternatively, system 800 in FIG. 8 may demonstrate and/or represent a situation in which power connector 104 is fully installed into and/or mated with power enclosure 102.

Figure 9:
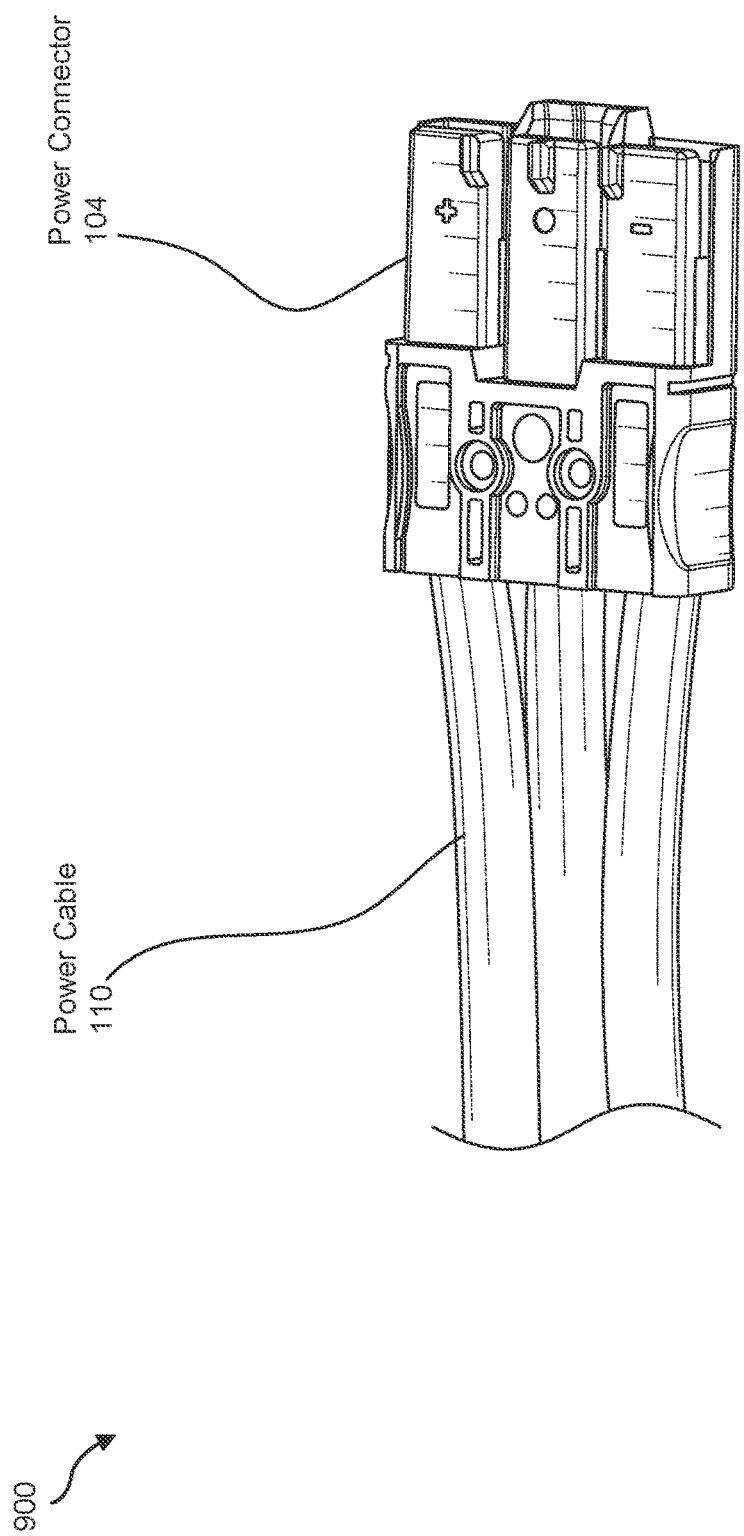
FIG. 9 is an illustration of an exemplary apparatus for protecting power connectors against high-power arcing.

FIG. 9 illustrates an exemplary apparatus 900 for protecting power connectors against high-power arcing. As illustrated in FIG. 9, exemplary apparatus 900 may include and/or represent power connector 104 electrically coupled to power cable 110, which facilitates carrying electric current to power supply module 112 via power enclosure 102. In some examples, apparatus 900 in FIG. 9 may implement and/or incorporate any of the technologies, configurations, designs, components, and/or features described above in connection with the apparatuses illustrated in FIGS. 1-8.

Figure 10:
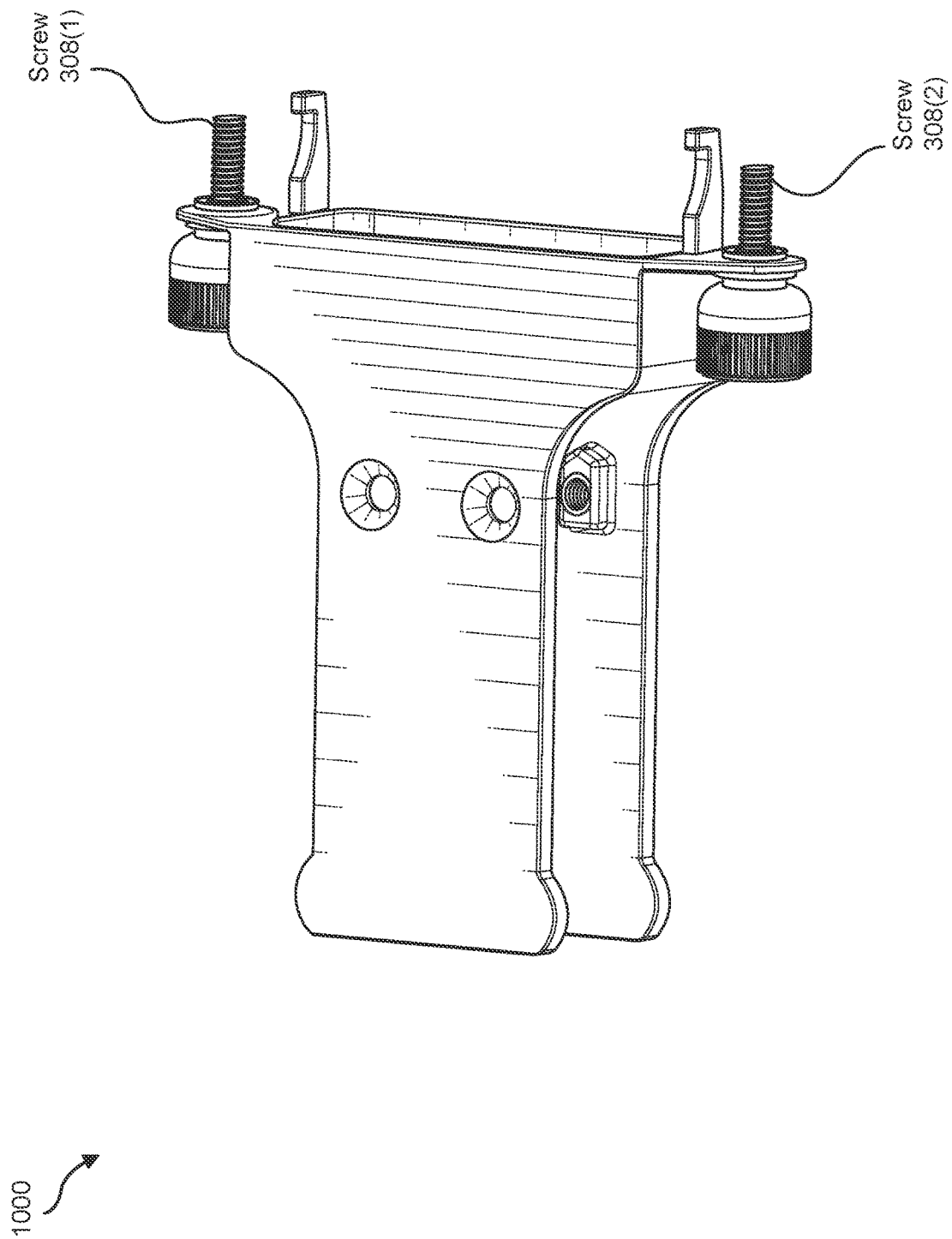
FIG. 10 is an illustration of an exemplary apparatus for protecting power connectors against high-power arcing.

FIG. 10 illustrates an exemplary mechanical handle 1000 dimensioned to couple to and/or partially cover power connector 104. As illustrated in FIG. 10, exemplary mechanical handle 1000 may be equipped with screws 308(1) and 308(2). In some examples, mechanical handle 1000 in FIG. 10 may implement and/or incorporate any of the technologies, configurations, designs, components, and/or features described above in connection with the apparatuses illustrated in FIGS. 1-9.

In some examples, mechanical handle 1000 may facilitate retrofitting apparatus 900, power connector 104, and/or power cable 110 for protecting against high-power arcing. In one example, mechanical handle 1000 may attach and/or couple to power connector 104 via one or more screws, fasteners, and/or adhesives.

Mechanical handle 1000 may include and/or form any suitable shape to facilitate and/or achieve the desired retrofitting. In addition, mechanical handle 1000 may be of any suitable sizes and/or dimensions to facilitate and/or achieve the desired retrofitting.

Mechanical handle 1000 may include and/or contain any of a variety of materials. Examples of such materials include, without limitation, plastics, ceramics, polymers, composites, rubbers, metals, combinations or variations of one or more of the same, and/or any other suitable materials.

Figure 11:
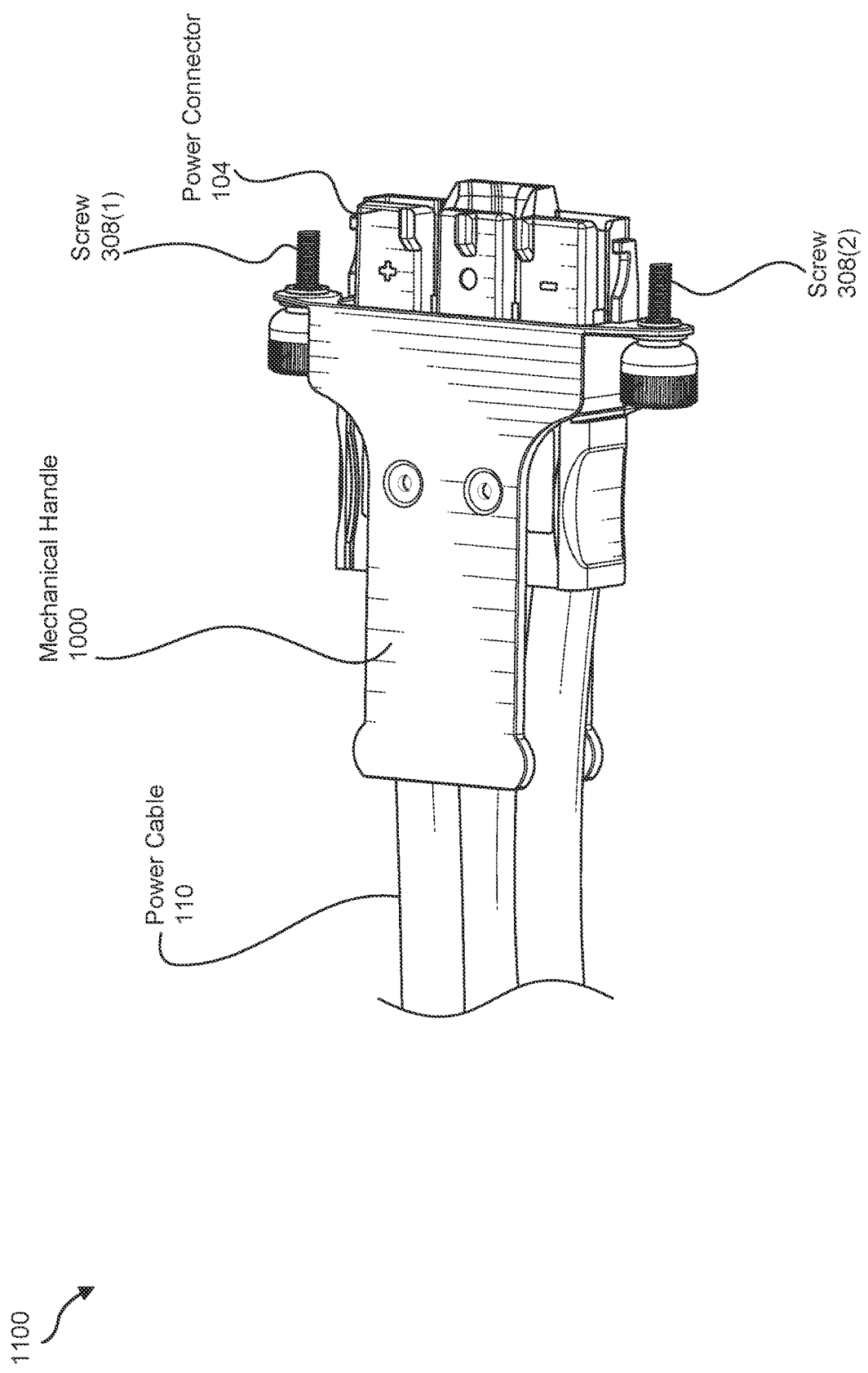
FIG. 11 is an illustration of an exemplary apparatus for protecting power connectors against high-power arcing.

FIG. 11 illustrates an exemplary apparatus 1100 for protecting power connectors against high-power arcing. As illustrated in FIG. 11, exemplary apparatus 1100 may include and/or represent power connector 104, power cable 110, mechanical handle 1000, and/or screws 308(1) and 308(2). In some examples, apparatus 1100 in FIG. 11 may implement and/or incorporate any of the technologies, configurations, designs, components, and/or features described above in connection with the apparatuses illustrated in FIGS. 1-10. In one example, mechanical handle 1000 may be coupled and/or attached to power connector 104. In this example, screws 308(1) and 308(2) may secure power connector 104 to power enclosure 102 and/or engage one or more power switches electrically coupled to power enclosure 102.

Figure 12:
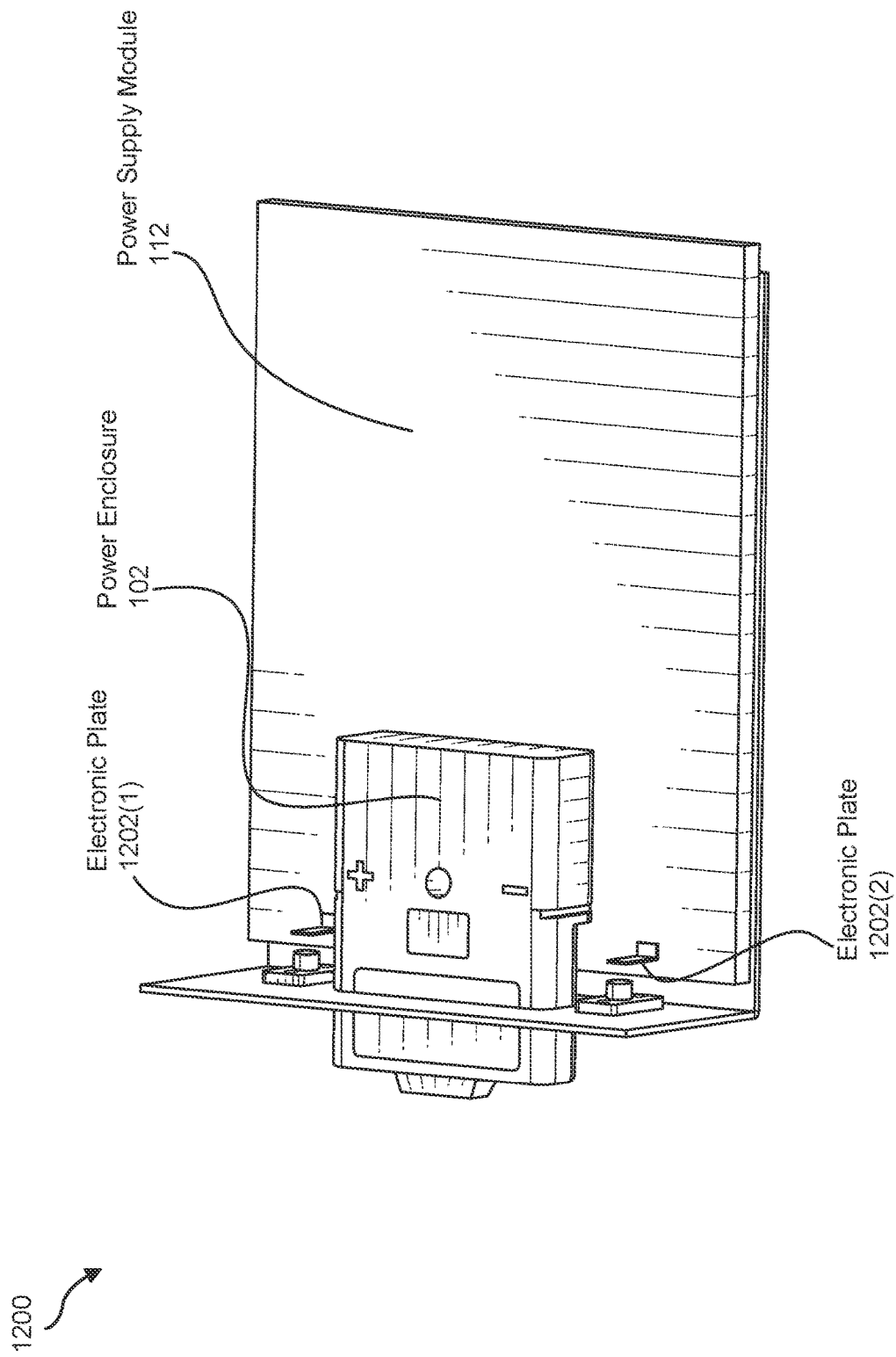
FIG. 12 is an illustration of an exemplary apparatus for protecting power connectors against high-power arcing.

FIG. 12 illustrates an exemplary apparatus 1200 for protecting power connectors against high-power arcing. As illustrated in FIG. 12, exemplary apparatus 1200 may include and/or represent power enclosure 102 coupled to and/or incorporated in power supply module 112. In some examples, apparatus 1200 in FIG. 12 may implement and/or incorporate any of the technologies, configurations, designs, components, and/or features described above in connection with the apparatuses illustrated in FIGS. 1-11. In one example, power supply module 112 may include and/or contain electronic plates 1202(1) and 1202(2) positioned to facilitate contact with screws 308(1) and 308(2), respectively, of power connector 104 once fully mated with power enclosure 102.

In some examples, the contact between screw 308(1) and electronic plate 1202(1) may cause a signal to propagate to power enclosure 102. Additionally or alternatively, the contact between screw 308(2) and electronic plate 1202(2) may cause a signal to propagate to power enclosure 102. In one example, the signal may be indicative of power connector 104 being fully mated with power enclosure 102. In response to the signal, power enclosure 102 may enable electric current to flow from power connector 104 to power supply module 112 via power enclosure 102.

Figure 13:
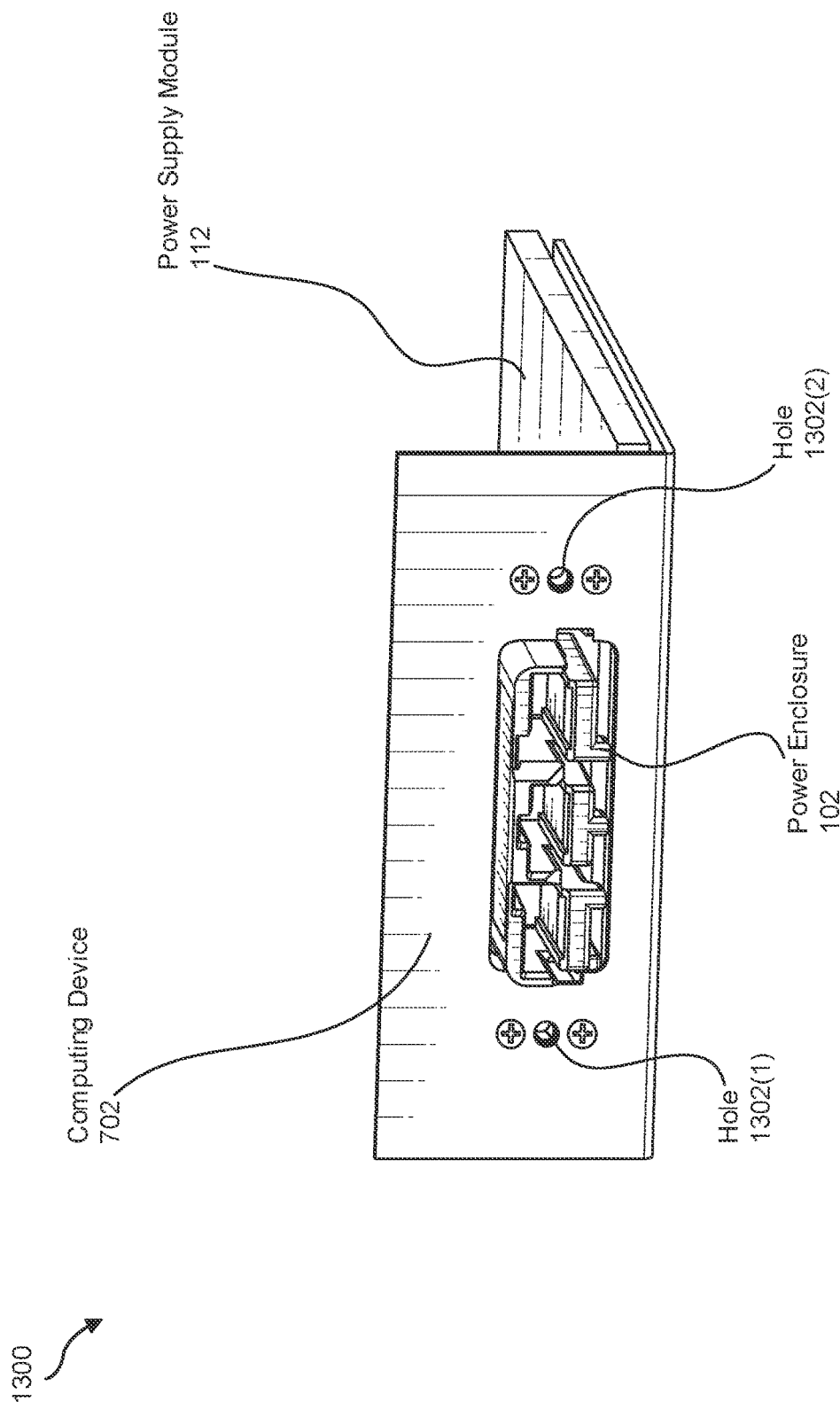
FIG. 13 is an illustration of an exemplary apparatus for protecting power connectors against high-power arcing.

FIG. 13 illustrates an exemplary apparatus 1300 for protecting power connectors against high-power arcing. As illustrated in FIG. 13, exemplary apparatus 1300 may include and/or represent power enclosure 102 coupled to and/or incorporated in power supply module 112 of computing device 702. In some examples, apparatus 1300 in FIG. 13 may implement and/or incorporate any of the technologies, configurations, designs, components, and/or features described above in connection with the apparatuses illustrated in FIGS. 1-12. In one example, computing device 702, power supply module 112, and/or power enclosure 102 may include and/or form holes 1302(1) and 1302(2) fitted to accept screws 308(1) and 308(2) to secure power connector 104 to power enclosure 102 and/or to enable the flow of electric current from power connector 104 to power supply 112 via power enclosure 102.

Figure 14:
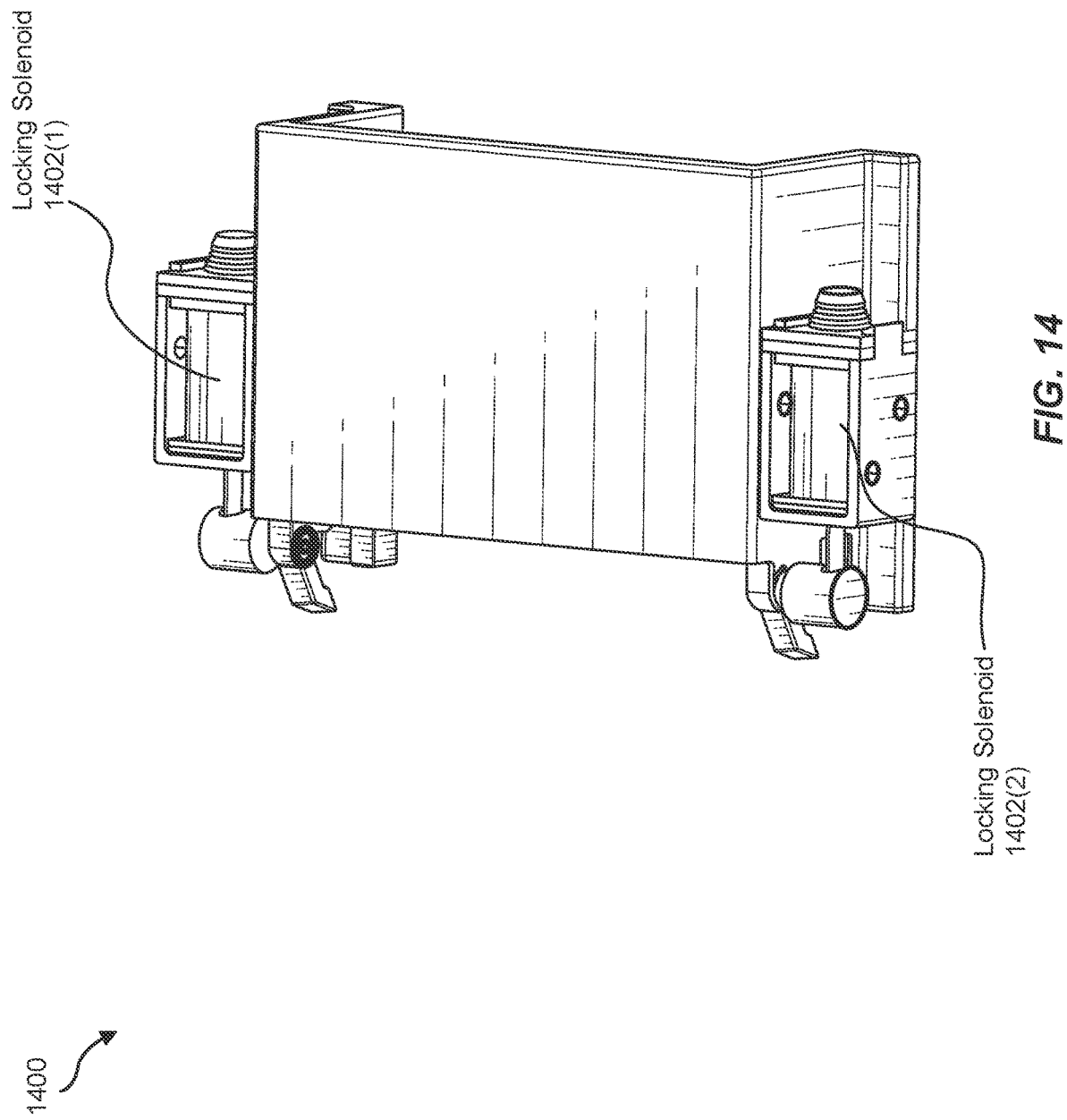
FIG. 14 is an illustration of an exemplary apparatus for protecting power connectors against high-power arcing.

FIG. 14 illustrates an exemplary locking assembly 1400 designed and/or configured to lock power connector 104 in place when fully and/or properly mated to power enclosure 102. As illustrated in FIG. 14, exemplary locking assembly 1400 may include and/or incorporate locking solenoids 1402(1) and 1402(2). In some examples, locking assembly 1400 may implement and/or incorporate any of the technologies, configurations, designs, components, and/or features described above in connection with the apparatuses illustrated in FIGS. 1-12.

In some examples, locking assembly 1400 may secure and/or lock power connector 104 in place by latching onto screws 308(1) and 308(2) via locking solenoids 1402(1) and 1402(2), respectively. In one example, locking assembly 1400 may facilitate retrofitting all or portions of apparatus 1200 or 1300 for protecting against high-power arcing. In this example, locking assembly 1400 may be attached and/or coupled to power supply module 112 atop power enclosure 102 via one or more screws, fasteners, and/or adhesives. In this position, locking assembly 1400 may be able to use locking solenoids 1402(1) and 1402(2) to secure screws 308(1) and 308(2), respectively, to ensure a full and/or proper mating between power connector 104 and power enclosure 102.

Locking assembly 1400 may include and/or form any suitable shape to facilitate and/or achieve the desired retrofitting. In addition, locking assembly 1400 may be of any suitable sizes and/or dimensions to facilitate and/or achieve the desired retrofitting.

Locking assembly 1400 may include and/or contain any of a variety of materials. Examples of such materials include, without limitation, plastics, ceramics, polymers, composites, rubbers, metals, combinations or variations of one or more of the same, and/or any other suitable materials.

Figure 15:
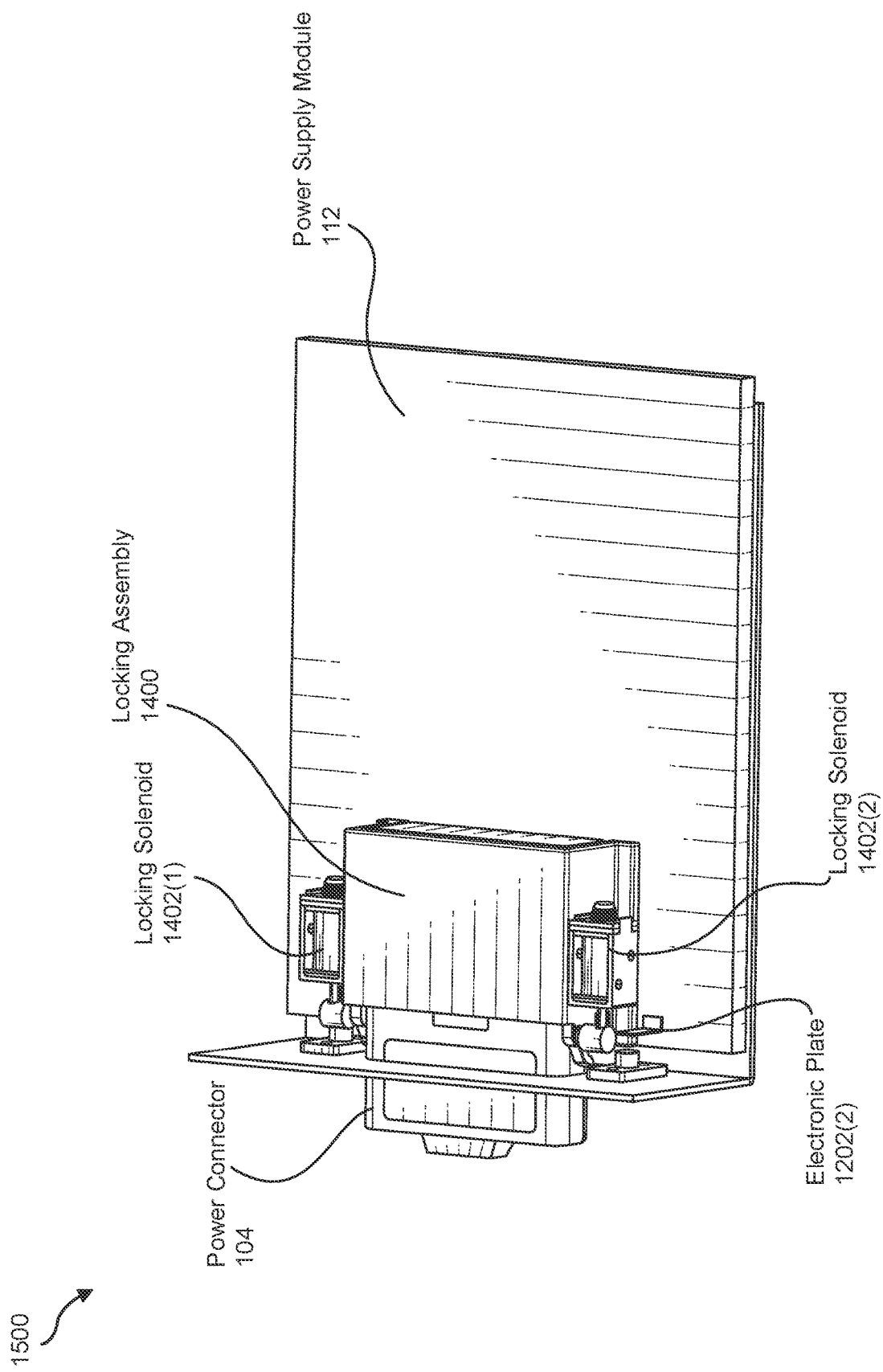
FIG. 15 is an illustration of an exemplary apparatus for protecting power connectors against high-power arcing.

FIG. 15 illustrates an exemplary apparatus 1500 for protecting power connectors against high-power arcing. As illustrated in FIG. 15, exemplary apparatus 1500 may include and/or represent power enclosure 102 coupled to and/or incorporated in power supply module 112 of computing device 702. In some examples, apparatus 1500 in FIG. 15 may implement and/or incorporate any of the technologies, configurations, designs, components, and/or features described above in connection with the apparatuses illustrated in FIGS. 1-14.

Figure 16:
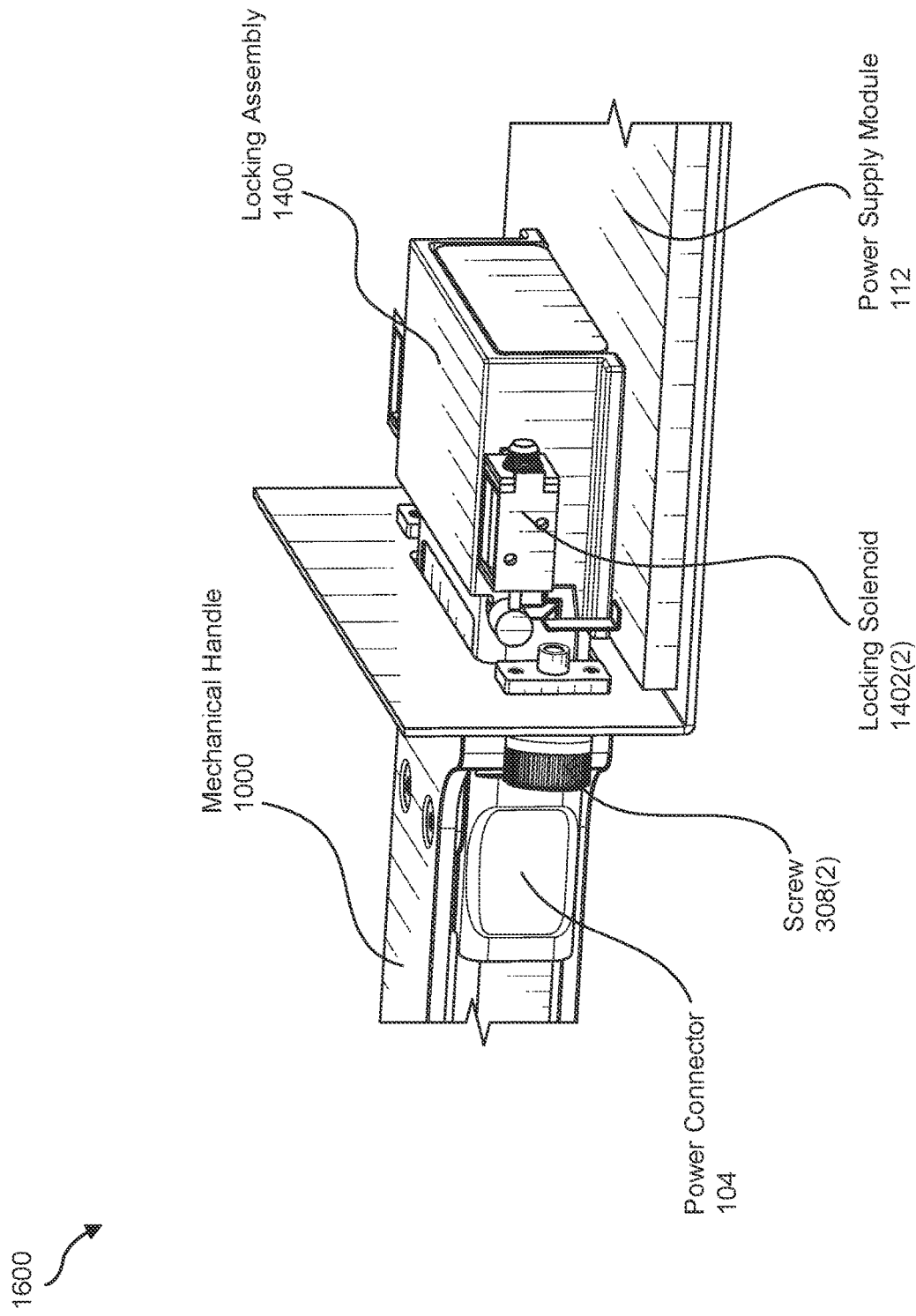
FIG. 16 is an illustration of an exemplary system for protecting power connectors against high-power arcing.
Figure 17:
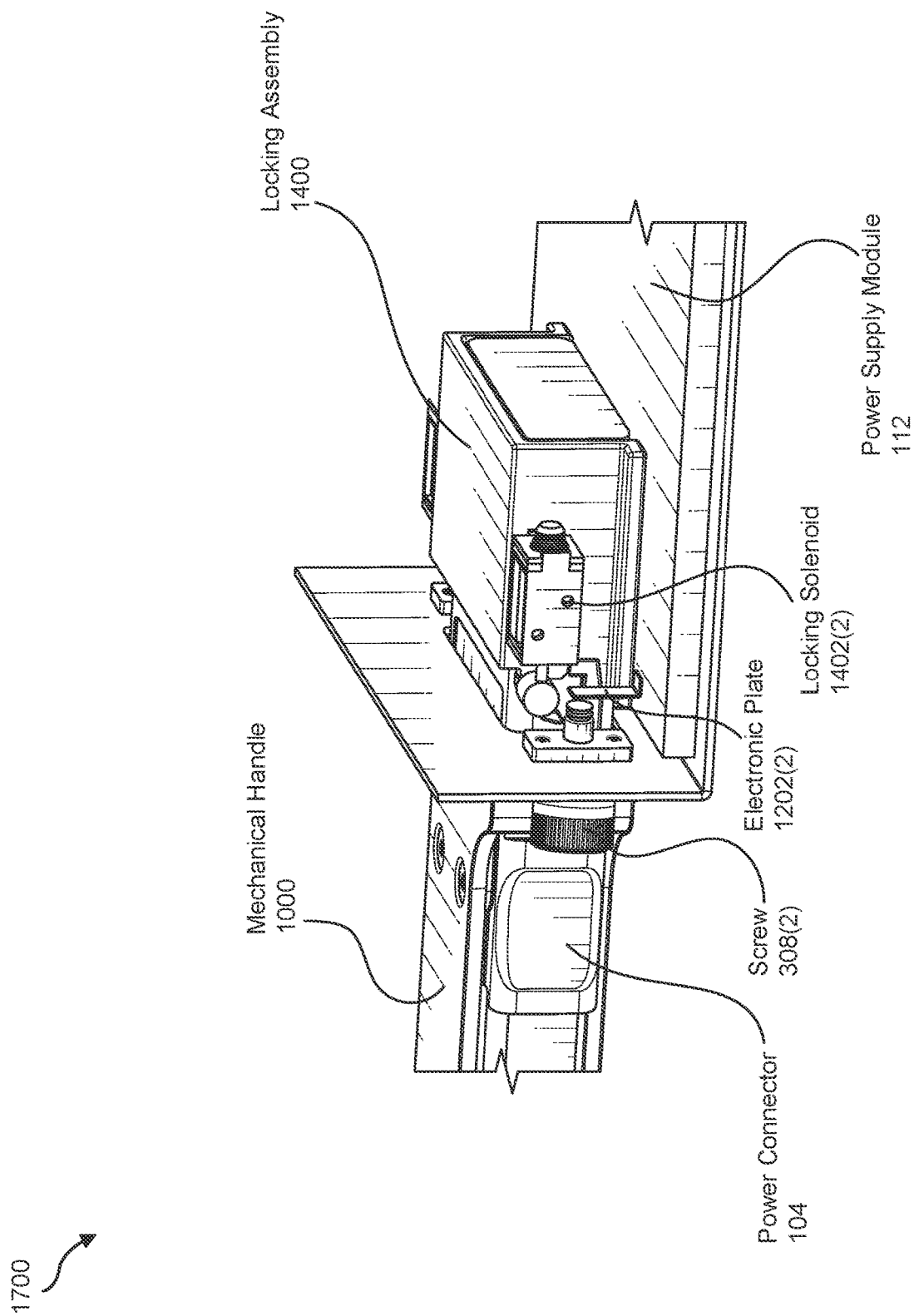
FIG. 17 is an illustration of an exemplary system for protecting power connectors against high-power arcing.
Figure 18:
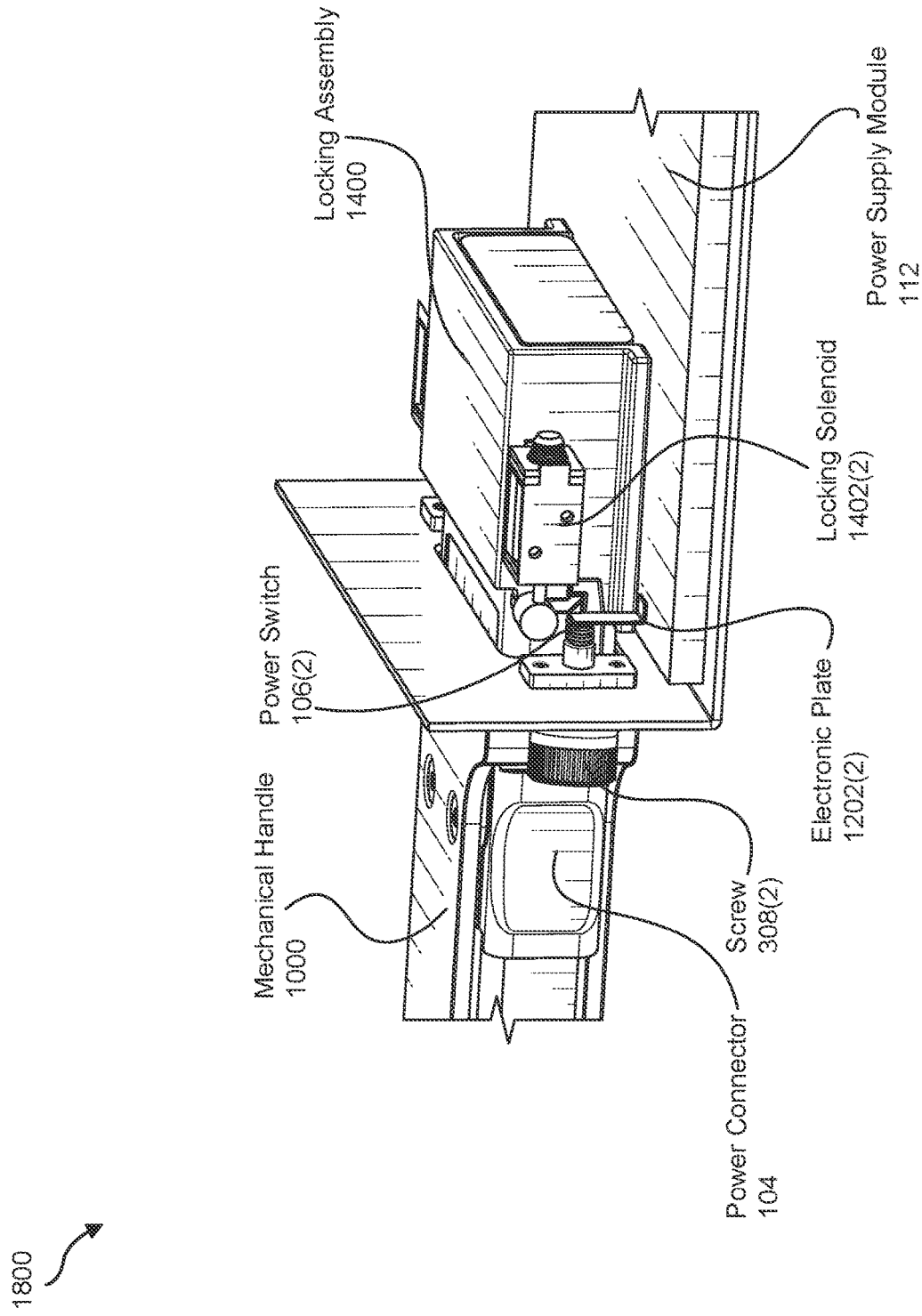
FIG. 18 is an illustration of an exemplary system for protecting power connectors against high-power arcing.

FIGS. 16, 17, and 18 illustrate exemplary systems 1600, 1700, and 1800, respectively, for protecting power connectors against high-power arcing. As illustrated in FIGS. 16-18, exemplary systems 1600, 1700, and 1800 may include and/or represent power enclosure 102, power connector 104, power supply module 112, screws 308(1) and 308(2), and/or locking assembly 1400. In some examples, systems 1600, 1700, and 1800 may implement and/or incorporate any of the technologies, configurations, designs, components, and/or features described above in connection with the apparatuses illustrated in FIGS. 1-15.

In one example, system 1600 may demonstrate and/or represent a situation in which screw 308(2) of power connector 104 has yet to be tightened and/or secured to power enclosure 102. In another example, system 1700 may demonstrate and/or a situation in which screw 308(2) of power connector 104 is currently in the processing of being tightened and/or rotated with respect to power enclosure 102. Additionally or alternatively, system 1800 may demonstrate and/or represent a situation in which screw 308(2) of power connector 104 has been fully tightened and/or secured to power enclosure 102. As a result, power connector 104 may be been fully and/or properly installed and/or mated to power enclosure 102.

Figure 19:
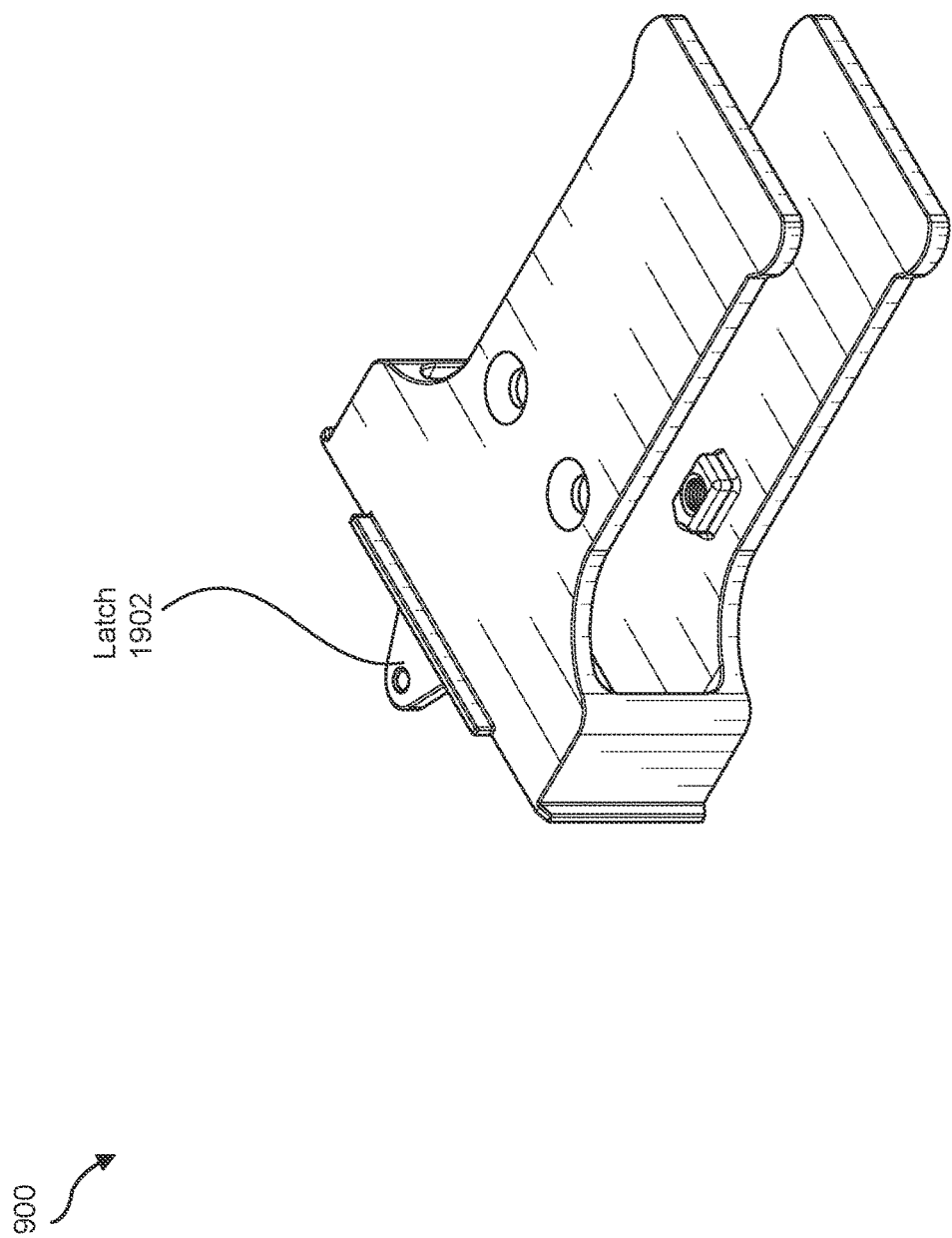
FIG. 19 is an illustration of an exemplary apparatus for protecting power connectors against high-power arcing.

FIG. 19 illustrates an exemplary mechanical handle 1900 dimensioned to couples to and/or partially cover power connector 104. As illustrated in FIG. 10, exemplary mechanical handle 1000 may be equipped with a latch 1902. In some examples, mechanical handle 1900 in FIG. 19 may implement and/or incorporate any of the technologies, configurations, designs, components, and/or features described above in connection with the apparatuses illustrated in FIGS. 1-18.

In some examples, mechanical handle 1900 may facilitate retrofitting apparatus 900, power connector 104, and/or power cable 110 for protecting against high-power arcing. In one example, mechanical handle 1900 may attach and/or couple to power connector 104 via one or more screws, fasteners, and/or adhesives.

Figure 20:
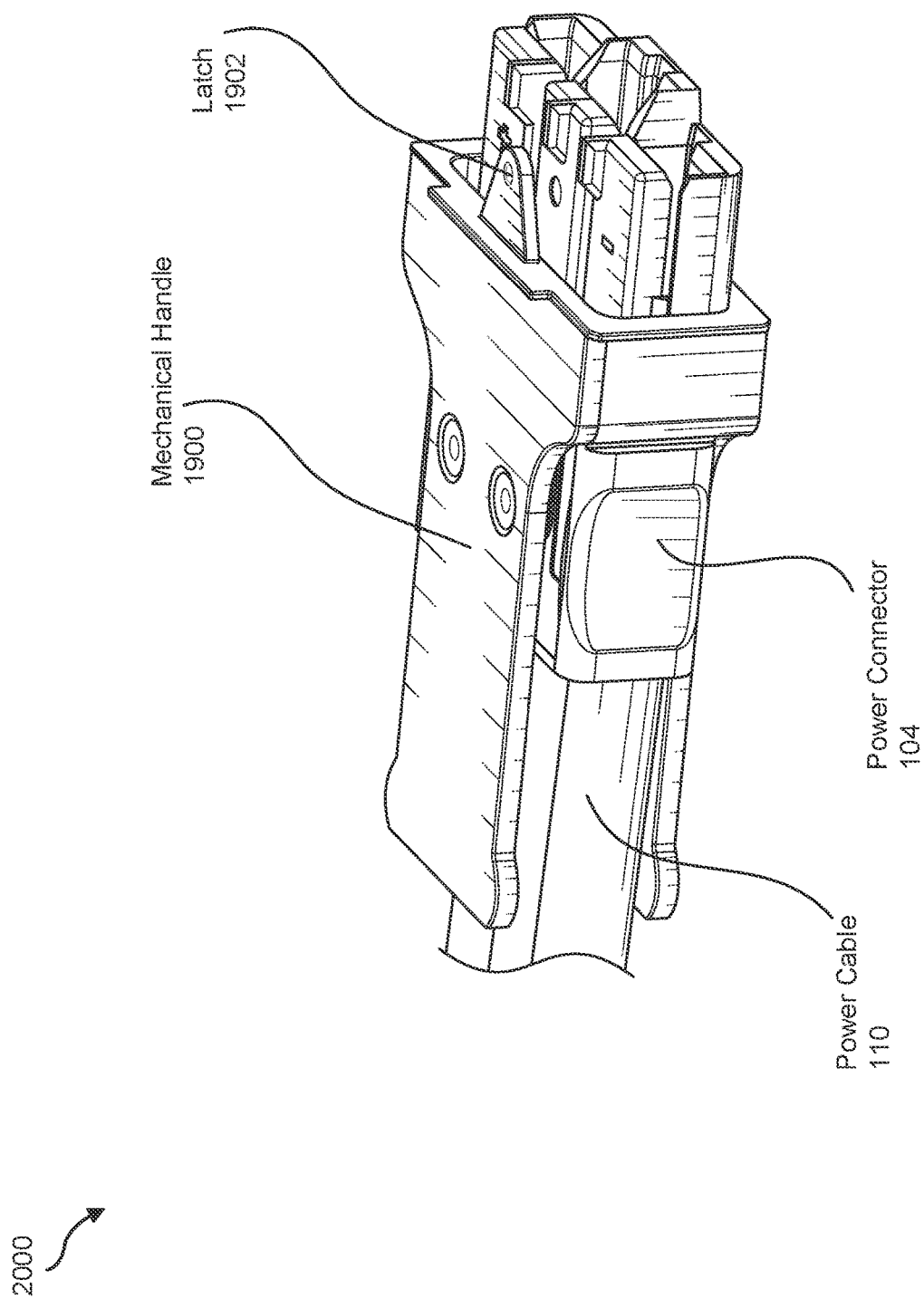
FIG. 20 is an illustration of an exemplary apparatus for protecting power connectors against high-power arcing.
Figure 21:
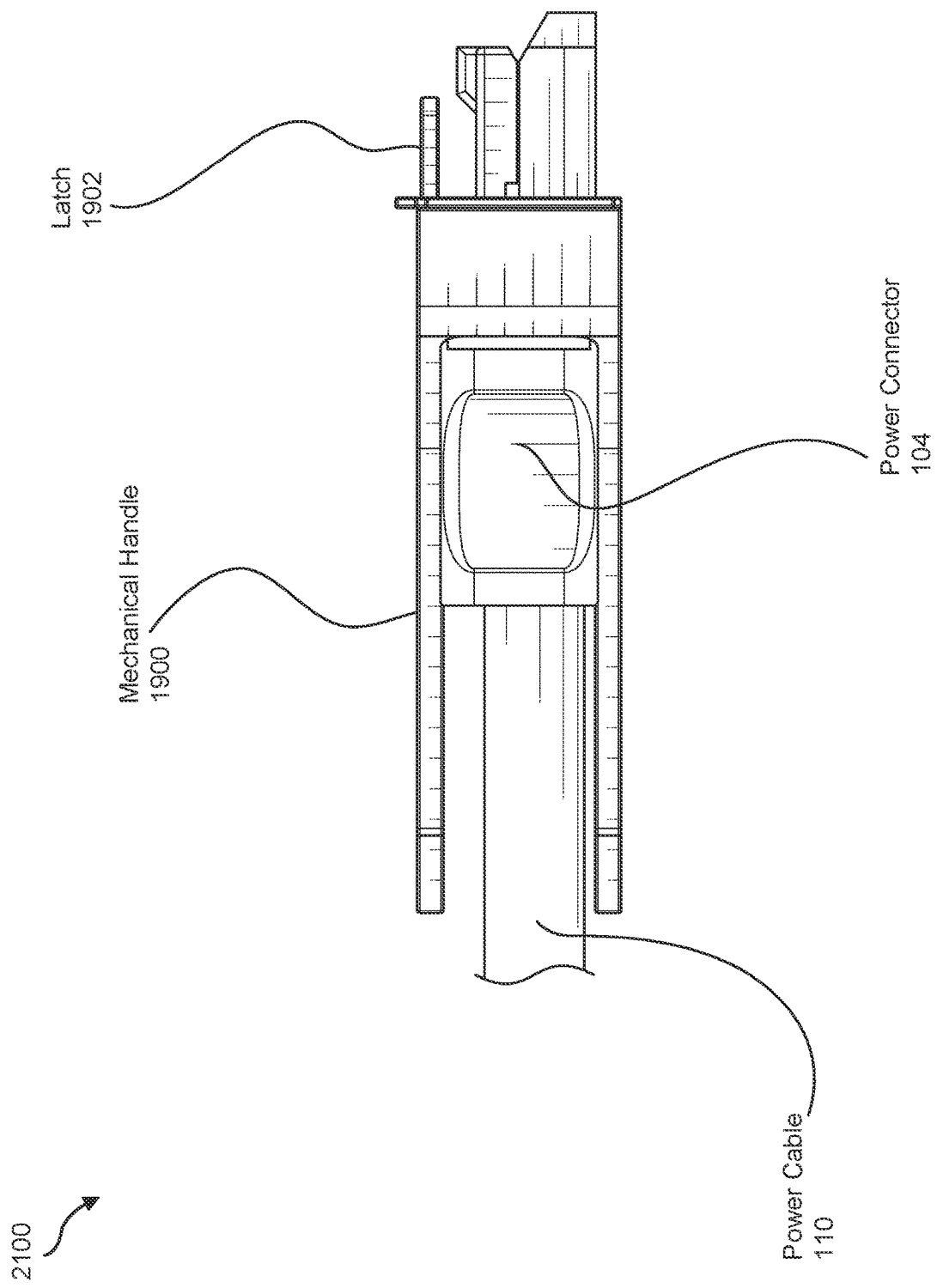
FIG. 21 is an illustration of an exemplary apparatus for protecting power connectors against high-power arcing.

FIGS. 20 and 21 illustrates exemplary apparatuses 2000 and 2100, respectively, for protecting power connectors against high-power arcing. As illustrated in FIGS. 20 and 21, exemplary apparatuses 2000 and 2100 may include and/or represent power connector 104, power cable 110, and/or mechanical handle 1900 with latch 1902. In some examples, apparatuses 2000 and 2100 may implement and/or incorporate any of the technologies, configurations, designs, components, and/or features described above in connection with the apparatuses illustrated in FIGS. 1-19. In one example, mechanical handle 1900 may be coupled and/or attached to power connector 104. In this example, latch 1902 may secure power connector 104 to power enclosure 102 and/or engage one or more power switches electrically coupled to power enclosure 102.

Figure 22:
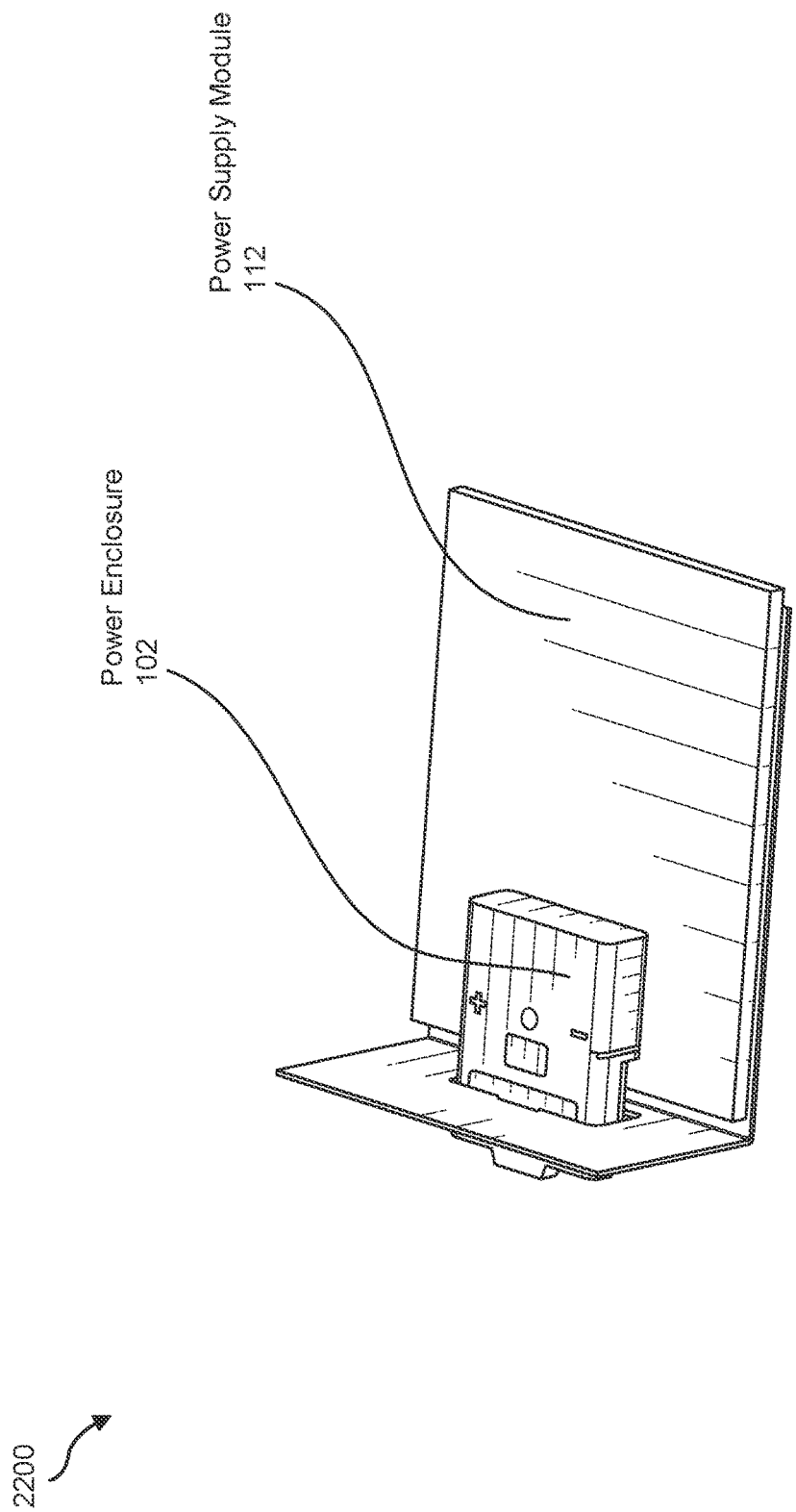
FIG. 22 is an illustration of an exemplary apparatus for protecting power connectors against high-power arcing.

FIG. 22 illustrates an exemplary apparatus 2200 for protecting power connectors against high-power arcing. As illustrated in FIG. 22, exemplary apparatus 2200 may include and/or represent power enclosure 102 coupled to and/or incorporated in power supply module 112. In some examples, apparatus 2200 in FIG. 22 may implement and/or incorporate any of the technologies, configurations, designs, components, and/or features described above in connection with the apparatuses illustrated in FIGS. 1-21.

Figure 23:
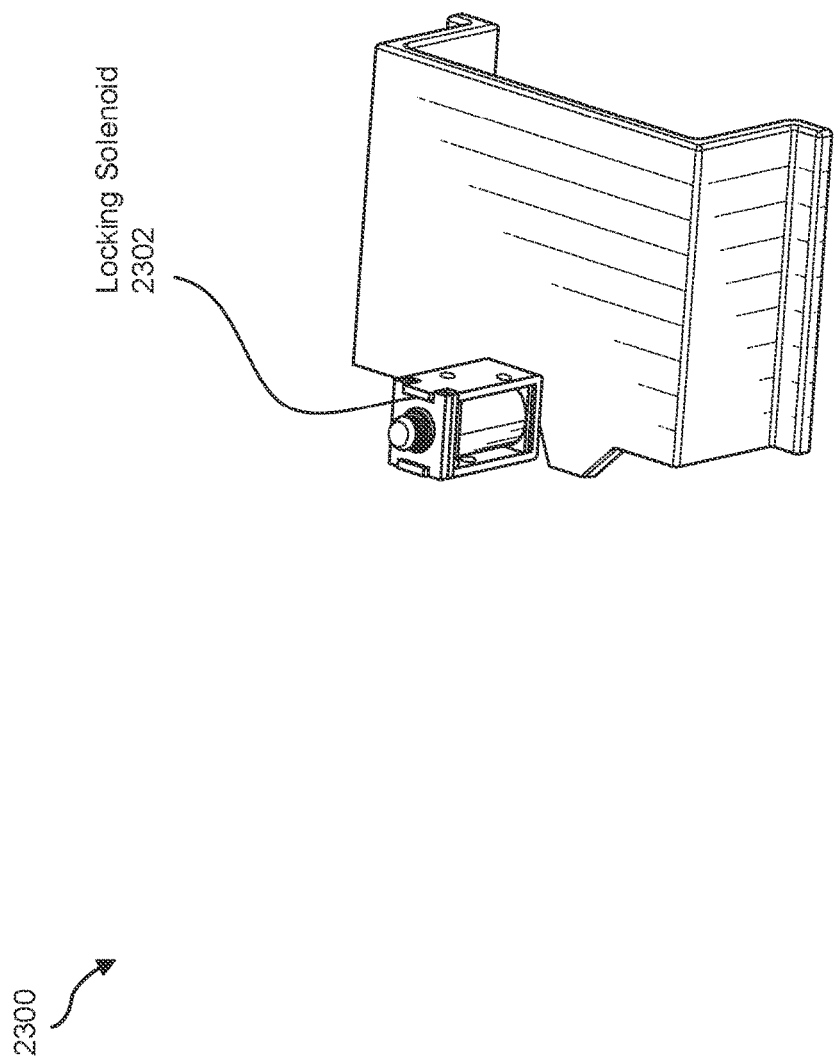
FIG. 23 is an illustration of an exemplary apparatus for protecting power connectors against high-power arcing.

FIG. 23 illustrates an exemplary locking assembly 2300 designed and/or configured to lock power connector 104 in place when fully and/or properly mated to power enclosure 102. As illustrated in FIG. 23, exemplary locking assembly 2300 may include and/or incorporate a locking solenoid 2302. In some examples, locking assembly 2300 may implement and/or incorporate any of the technologies, configurations, designs, components, and/or features described above in connection with the apparatuses illustrated in FIGS. 1-22.

In some examples, locking assembly 2300 may secure and/or lock power connector 104 in place by way of latch 1902 of mechanical handle 1900. In one example, locking assembly 2300 may facilitate retrofitting all or portions of apparatus 2200 for protecting against high-power arcing. In this example, locking assembly 2300 may be attached and/or coupled to power supply module 112 atop power enclosure 102 via one or more screws, fasteners, and/or adhesives. In this position, locking assembly 2300 may be able to use locking solenoid 2302 to secure latch 1902 to ensure a full and/or proper mating between power connector 104 and power enclosure 102.

Locking assembly 2300 may include and/or form any suitable shape to facilitate and/or achieve the desired retrofitting. In addition, locking assembly 2300 may be of any suitable sizes and/or dimensions to facilitate and/or achieve the desired retrofitting.

Locking assembly 2300 may include and/or contain any of a variety of materials. Examples of such materials include, without limitation, plastics, ceramics, polymers, composites, rubbers, metals, combinations or variations of one or more of the same, and/or any other suitable materials.

Figure 24:
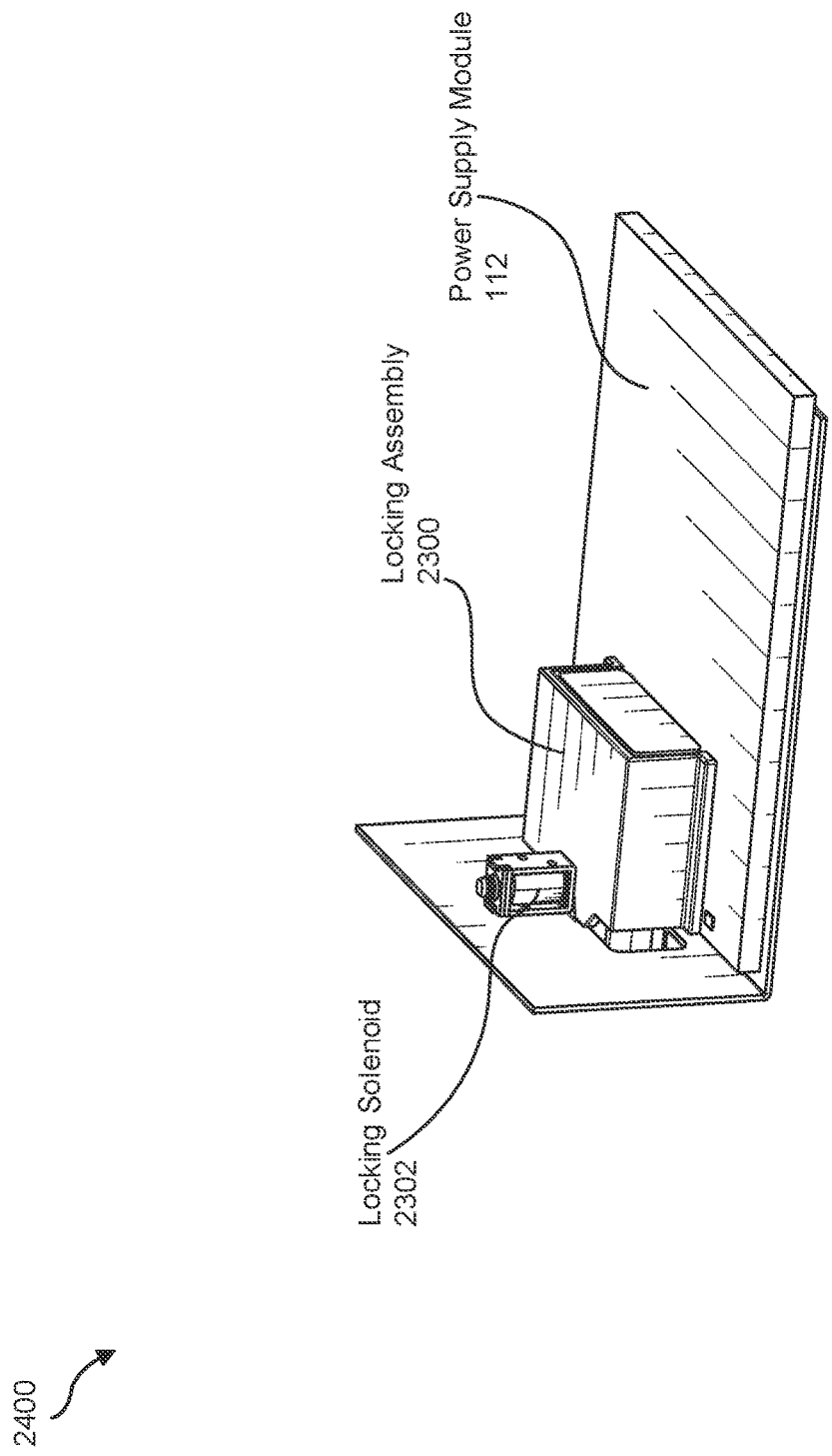
FIG. 24 is an illustration of an exemplary apparatus for protecting power connectors against high-power arcing.

FIG. 24 illustrates an exemplary apparatus 2400 for protecting power connectors against high-power arcing. As illustrated in FIG. 24, exemplary apparatus 2400 may include and/or represent power enclosure 102 coupled to and/or incorporated in power supply module 112 of computing device 702. In some examples, apparatus 2400 in FIG. 24 may implement and/or incorporate any of the technologies, configurations, designs, components, and/or features described above in connection with the apparatuses illustrated in FIGS. 1-23.

Figure 25:
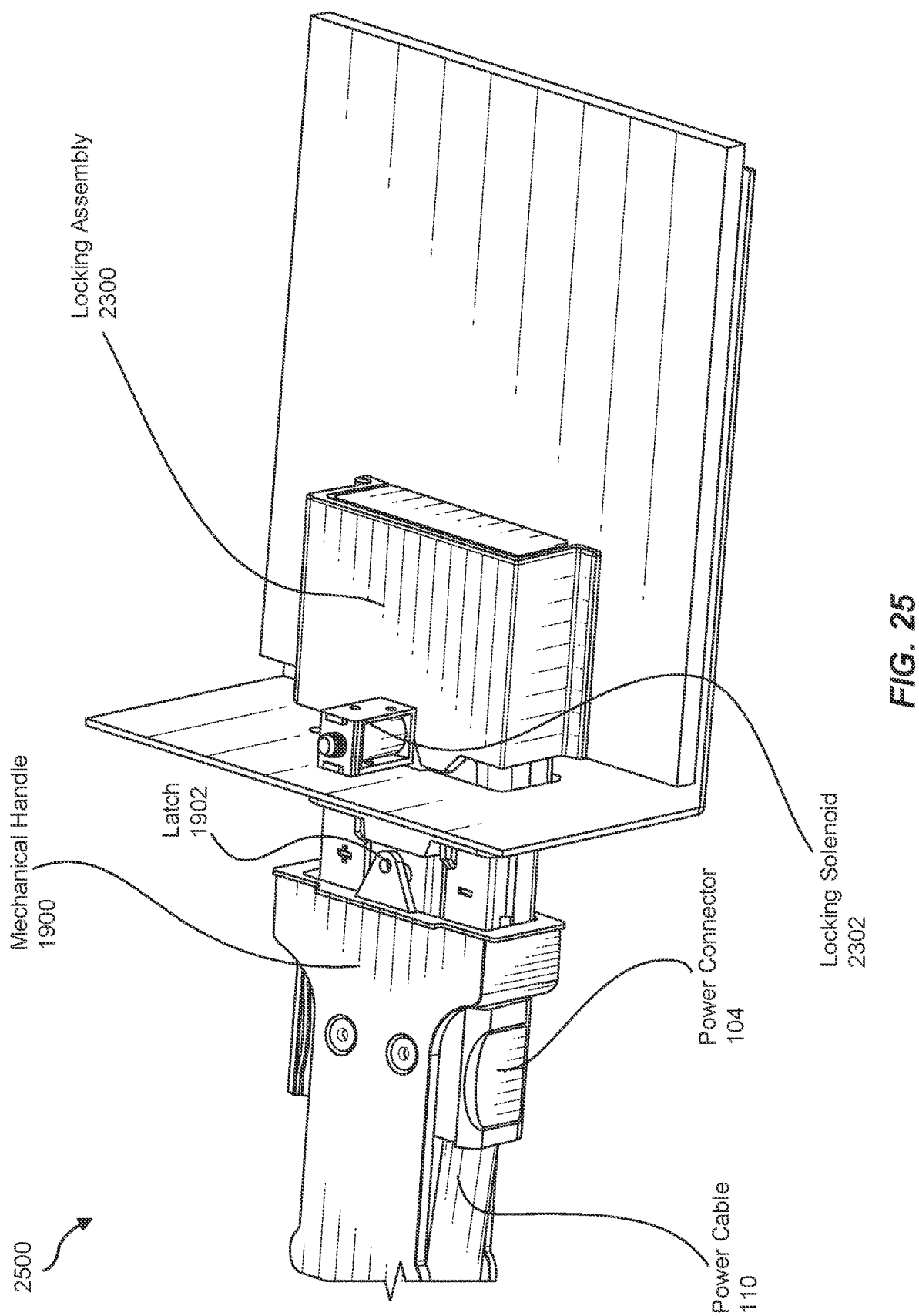
FIG. 25 is an illustration of an exemplary system for protecting power connectors against high-power arcing.
Figure 26:
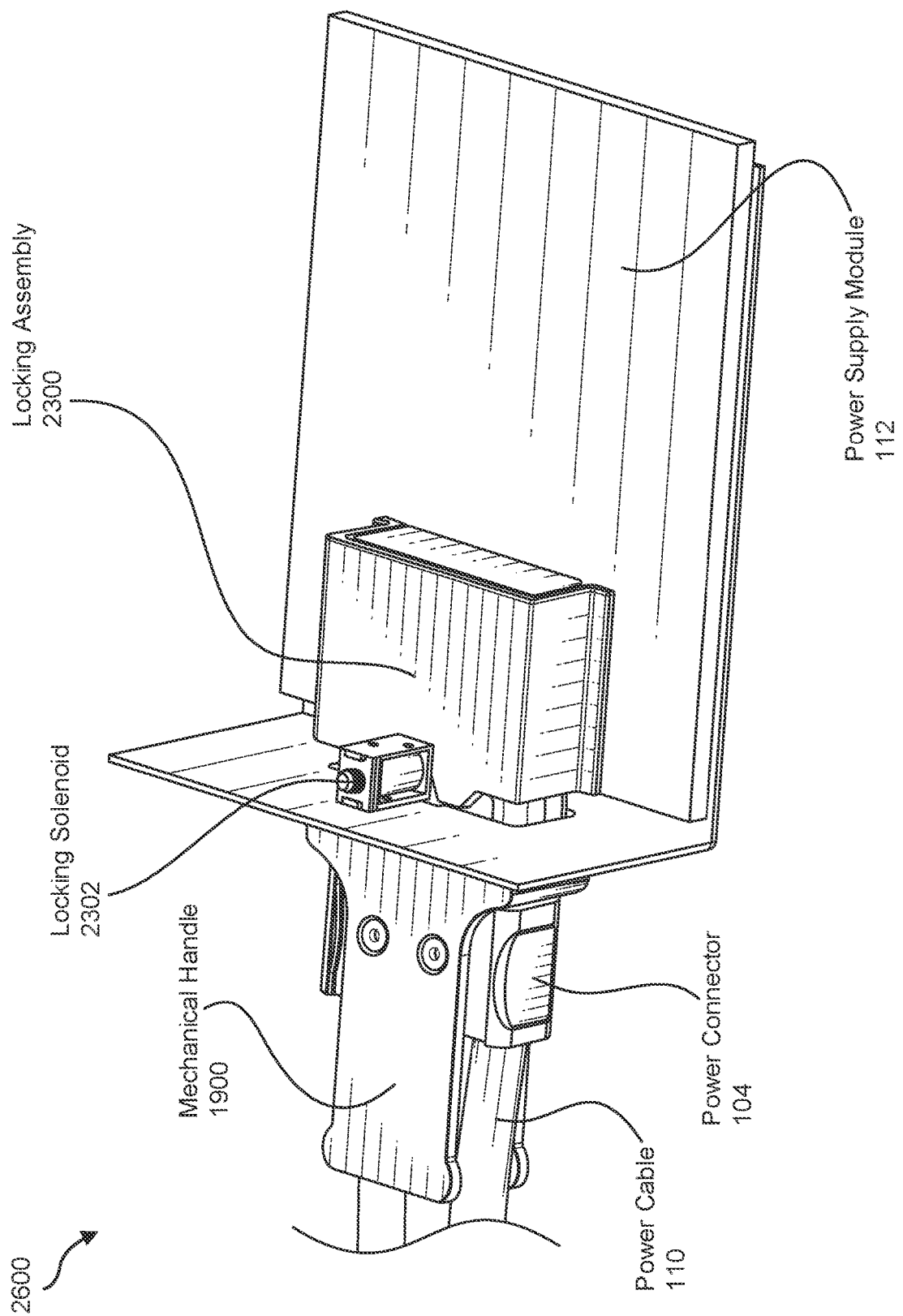
FIG. 26 is an illustration of an exemplary system for protecting power connectors against high-power arcing.

FIGS. 25 and 26 illustrate exemplary systems 2500 and 2600, respectively, for protecting power connectors against high-power arcing. As illustrated in FIGS. 25 and 26, exemplary systems 2500 and 2600 may include and/or represent power enclosure 102, power connector 104, power supply module 112, mechanical handle 1900, and/or locking assembly 2300. In some examples, systems 2500 and 2600 may implement and/or incorporate any of the technologies, configurations, designs, components, and/or features described above in connection with the apparatuses illustrated in FIGS. 1-24.

In one example, system 2500 may demonstrate and/or represent a situation in which latch 1902 of mechanical handle 1900 has yet to reach locking solenoid 2302 as power connector 104 is installed into and/or mated with power enclosure 102. In another example, system 2500 may demonstrate and/or represent a situation in which latch 1902 of mechanical handle 1900 has left locking solenoid 2302 as power connector 104 is uninstalled and/or mated from power enclosure 102. Additionally or alternatively, system 2600 may demonstrate and/or represent a situation in which latch 1902 of mechanical handle 1900 is fully engaged with locking solenoid 2302 and power connector 104 is fully and/or properly mated with power enclosure 102.

The various apparatuses and/or systems disclosed herein may include and/or represent circuitry and/or processing devices that are not expressly illustrated and/or labelled in FIGS. 1-26. For example, any of the apparatuses and/or systems disclosed herein may include and/or represent a physical processing device that detects and/or determines whether or not power switch 106 is engaged by feature 108 of power connector 104. In one example, if the processing device detects that power switch 106 is so engaged, the processing device may cause and/or direct power enclosure 102 to close a circuit that enables the flow of electric current from power connector 104 to power supply module 112 via power enclosure 102. Additionally or alternatively, if the processing device detects that power switch 106 is not so engaged, the processing device may cause and/or direct power enclosure 102 to open the circuit to disable the flow of electric current from power connector 104 to power supply module 112 via power enclosure 102.

Figure 27:
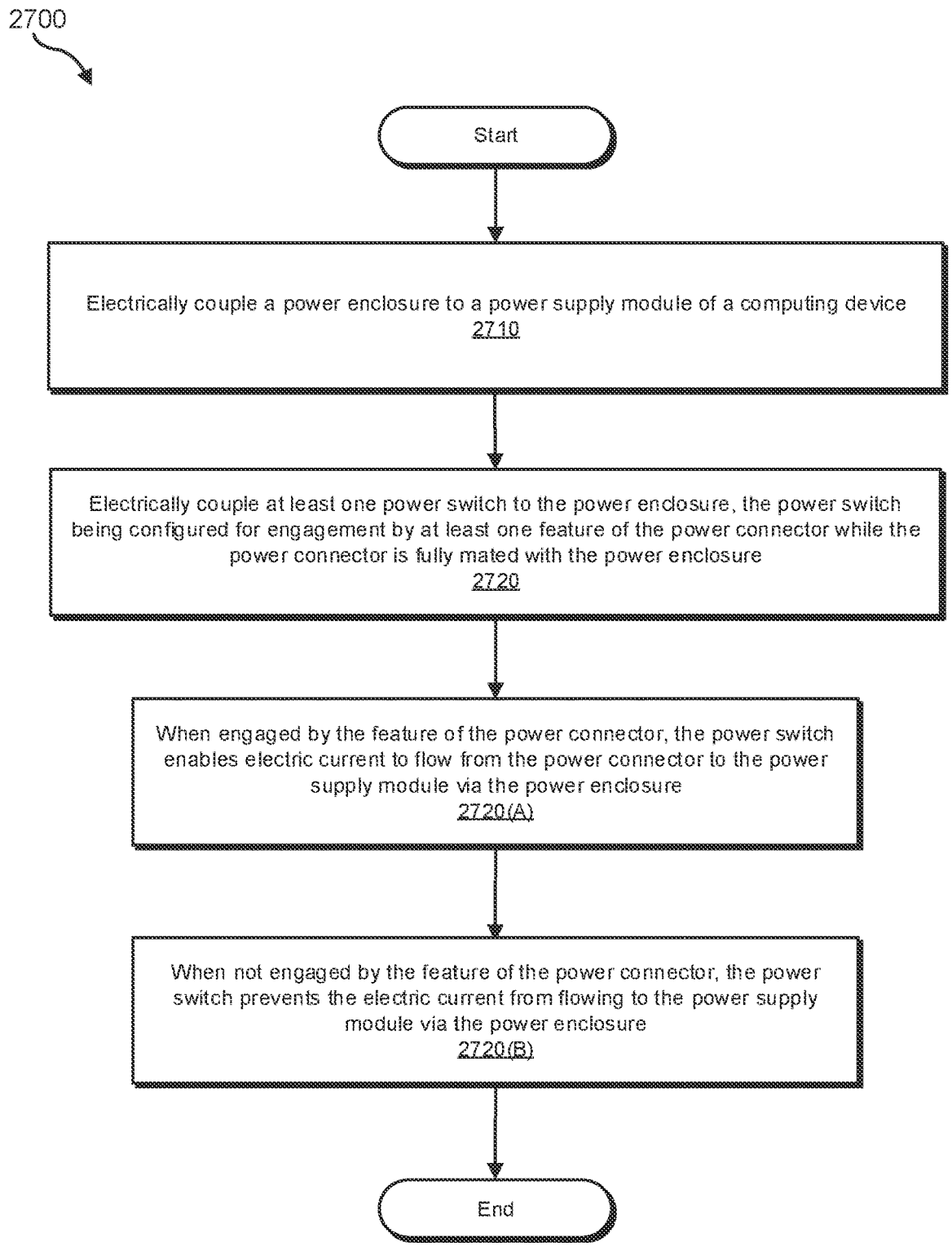
FIG. 27 is a flow diagram of an exemplary method for protecting power connectors against high-power arcing.

FIG. 27 is a flow diagram of an exemplary method 2700 for protecting power connectors against high-power arcing. Method 2700 may include the step of electrically coupling a power enclosure to a power supply module of a computing device (2710). Step 2710 may be performed in a variety of ways, including any of those described above in connection with FIGS. 1-26. For example, a computing equipment manufacturer or subcontractor may manufacture a power supply module for a network device (such as a router or switch). In this example, as part of the manufacturing process, the computing equipment manufacturer or subcontractor may electrically couple a power enclosure to the power supply module of the network device.

Method 2700 may also include the step of electrically coupling at least one power switch to the power enclosure, the power switch being configured for engagement by at least one feature of the power connector while the power connector is fully mated with the power enclosure (2720). Step 2720 may be performed in a variety of ways, including any of those described above in connection with FIGS. 1-26. For example, as part of the manufacturing process, the computing equipment manufacturer or subcontractor may electrically couple at least one power switch to the power enclosure. In this example, the power switch may be configured for engagement by at least one feature of the power connector while the power connector is fully mated with the power enclosure.

As a result, when engaged by the feature of the power connector, the power switch may enable electric current to flow from the power connector to the power supply module via the power enclosure (2720(A)). In contrast, when not engaged by the feature of the power connector, the power switch may prevent electric current from flowing to the power supply module via the power enclosure (2720(B)).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
a power enclosure electrically coupled to a power supply module of a computing device;
a power connector that:
is electrically coupled to a power cable that facilitates carrying electric current to the power supply module via the power enclosure; and
is dimensioned to mate with the power enclosure; and
at least one power switch that:
is electrically coupled to the power enclosure;
is configured to be engaged by at least one feature of the power connector while the power connector is fully mated with the power enclosure;
when engaged by the at least one feature of the power connector, enables electric current to flow from the power connector to the power supply module via the power enclosure;
changes from a state in which the at least one feature of the power connector is engaged to an additional state in which the at least one feature of the power connector is not engaged; and
upon changing to the additional state, interrupts the flow of electric current from the power connector to the power supply module via the power enclosure to prevent electrical arcing as the power connector is removed from the power enclosure.

2. The apparatus of claim 1, wherein the power switch, when not engaged by the at least one feature of the power connector, prevents the electric current from flowing to the power supply module via the power enclosure.

3. The apparatus of claim 2, wherein: the power enclosure comprises at least one electrical contact; the power connector comprises at least one additional electrical contact that electrically couples with the electrical contact of the power enclosure to enable the electric current to flow from the power connector to the power supply module.

4. The apparatus of claim 1, wherein:
the at least one feature of the power connector comprises a latch that prevents the power connector from disconnecting from the power enclosure while the electric current is flowing from the power connector to the power supply module via the power enclosure; and
the power switch comprises an electromechanical lock that retains the latch of the power connector in place while the electric current is flowing from the power connector to the power supply module via the power enclosure.

5. The apparatus of claim 4, wherein the electromechanical lock comprises a locking solenoid.

6. The apparatus of claim 1, wherein the power switch opens a circuit that disables the flow of electric current from the power connector to the power supply module via the power enclosure as the power connector is removed from the power enclosure.

7. The apparatus of claim 1, wherein the power switch closes a circuit that enables the flow of electric current from the power connector to the power supply module via the power enclosure after the power connector is installed into the power enclosure.

8. The apparatus of claim 1, wherein:
the at least one feature of the power connector includes at least one screw;
the power enclosure includes at least one screw hole fitted to accept the screw; and
the power switch comprises a plate positioned to facilitate contact with the at least one screw of the power connector when the power connector is fully mated with the power enclosure.

9. The apparatus of claim 8, wherein:
the contact between the at least one screw and the plate causes a signal indicative of the power connector being fully mated with the power enclosure to propagate to the power enclosure; and
in response to the signal, the power enclosure enables the electric current to flow from the power connector to the power supply module via the power enclosure.

10. The apparatus of claim 8, wherein:
the at least one screw closes a circuit via the plate while the power connector is fully mated with the power enclosure; and
the closed circuit causes the power enclosure to enable the electric current to flow from the power connector to the power supply module via the power enclosure.

11. The apparatus of claim 1, wherein:
the at least one feature of the power connector includes at least one screw;
the power enclosure includes at least one screw hole fitted to accept the screw; and
the power switch comprises a button that is compressed by the at least one screw when the power connector is fully mated with the power enclosure.

12. The apparatus of claim 1, wherein the electric current comprises Direct Current (DC).

13. A system comprising:
a power supply module;
a power enclosure electrically coupled to the power supply module;
a power connector that:
is electrically coupled to a power cable that facilitates carrying electric current to the power supply module via the power enclosure; and
is dimensioned to mate with the power enclosure; and
at least one power switch that:
is electrically coupled to the power enclosure;
is configured to be engaged by at least one feature of the power connector while the power connector is fully mated with the power enclosure;
when engaged by the at least one feature of the power connector, enables electric current to flow from the power connector to the power supply module via the power enclosure;
changes from a state in which the at least one feature of the power connector is engaged to an additional state in which the at least one feature of the power connector is not engaged; and upon changing to the additional state, interrupts the flow of electric current from the power connector to the power supply module via the power enclosure to prevent electrical arcing as the power connector is removed from the power enclosure.

14. The system of claim 13, wherein the power switch, when not engaged by the at least one feature of the power connector, prevents the electric current from flowing to the power supply module via the power enclosure.

15. The system of claim 14, wherein:

the power enclosure comprises at least one electrical contact;

the power connector comprises at least one additional electrical contact that electrically couples with the electrical contact of the power enclosure to enable the electric current to flow from the power connector to the power supply module; and the power switch:

changes from a state in which the at least one feature of the power connector is engaged to an additional state in which the at least one feature the feature of the power connector is not engaged; and upon changing to the additional state, interrupts the flow of electric current from the power connector to the power supply module via the power enclosure to prevent electrical arcing as the power connector is removed from the power enclosure.

16. The system of claim 13, wherein:

the at least one feature of the power connector comprises a latch that prevents the power connector from disconnecting from the power enclosure while the electric current is flowing from the power connector to the power supply module via the power enclosure; and the power switch comprises an electromechanical lock that retains the latch of the power connector in place while the electric current is flowing from the power connector to the power supply module via the power enclosure.

17. The system of claim 16, wherein the electromechanical lock comprises a locking solenoid.

18. The system of claim 13, wherein the power switch opens a circuit that disables the flow of electric current from the power connector to the power supply module via the power enclosure as the power connector is removed from the power enclosure.

19. The system of claim 13, wherein the power switch closes a circuit that enables the flow of electric current from the power connector to the power supply module via the power enclosure after the power connector is installed into the power enclosure.

20. A method comprising:

electrically coupling a power enclosure to a power supply module of a computing device; and electrically coupling at least one power switch to the power enclosure, the power switch being configured for engagement by at least one feature of a power connector while the power connector is fully mated with the power enclosure such that:

when engaged by the at least one feature of the power connector, the power switch enables electric current to flow from the power connector to the power supply module via the power enclosure; and when not engaged by the at least one feature of the power connector, the power switch prevents the electric current from flowing to the power supply module via the power enclosure and prevents electrical arcing as the power connector is removed from the power enclosure.

* * * * *